United States Patent
Cheng et al.

(10) Patent No.: US 10,938,310 B1
(45) Date of Patent: Mar. 2, 2021

(54) SEAMLESS SWITCHING OF RESONANT TANKS IN POWER CONVERTERS BY MATCHING VOLTAGE GAINS AT TANK SWITCHOVER

(71) Applicant: Hong Kong Applied Science and Technology Research Institute Company, Limited, Hong Kong (HK)

(72) Inventors: Chi Man Cheng, Hong Kong (HK); Shek Mong Wong, Hong Kong (HK); Tak Lok Shum, Hong Kong (HK)

(73) Assignee: Hong Kong Applied Science and Technology Research Institute Company, Limited, Hong Kong (HK)

( * ) Notice: Subject to any disclaimer, the term of this patent is extended or adjusted under 35 U.S.C. 154(b) by 0 days.

(21) Appl. No.: 16/732,378

(22) Filed: Jan. 2, 2020

(51) Int. Cl.
*H02M 3/335* (2006.01)
*H02M 3/155* (2006.01)

(52) U.S. Cl.
CPC ....... *H02M 3/33507* (2013.01); *H02M 3/155* (2013.01); *H02M 3/33592* (2013.01)

(58) Field of Classification Search
None
See application file for complete search history.

(56) References Cited

U.S. PATENT DOCUMENTS

| | | | |
|---|---|---|---|
| 9,318,946 | B2 | 4/2016 | Feng et al. |
| 9,774,271 | B2 | 9/2017 | Dai et al. |
| 9,837,918 | B2 | 12/2017 | Ye et al. |
| 10,181,804 | B1 | 1/2019 | Li et al. |
| 10,826,405 | B1 * | 11/2020 | Bala ................... H02M 3/33592 |
| 2006/0176034 | A1 | 8/2006 | Skinner |
| 2016/0014858 | A1 | 1/2016 | Ramabhadran |
| 2016/0149501 | A1 * | 5/2016 | Dai ..................... H02M 3/3372 363/21.02 |
| 2018/0294732 | A1 * | 10/2018 | Ye .......................... H02M 3/337 |
| 2019/0058408 | A1 * | 2/2019 | Hao .................. H02M 3/33584 |

FOREIGN PATENT DOCUMENTS

| | | |
|---|---|---|
| CN | 101335490 A | 12/2008 |
| CN | 103296882 A | 9/2013 |
| CN | 103339843 A | 10/2013 |
| CN | 104638932 A | 5/2015 |
| EP | 2670037 A1 | 4/2013 |

OTHER PUBLICATIONS

ISR and Written Opinion, PCT/CN2020/071949, dated Sep. 27, 2020.

* cited by examiner

*Primary Examiner* — Jeffrey A Gblende
(74) *Attorney, Agent, or Firm* — Stuart T. Auvinen; gPatent LLC

(57) ABSTRACT

A DC-DC power converter has an auxiliary tank cascaded to share an efficiency tank's inductor, capacitor, and transformer. Switching transistors pump the auxiliary tank at startup to provide a boost current. The switching frequency is reduced in steps and the voltage gain and power of the converter sensed until the voltage gain matches a voltage gain calculated for the efficiency tank. Then tank switchover occurs and transistors to the efficiency tank are pumped with the last switching frequency used by the auxiliary tank, and the auxiliary tank is not pumped. Since the voltage gains before and after tank switchover are equal, no output voltage deviation or current spike occurs. A voltage sag or failure switches back to the auxiliary tank at a switching frequency determined by a dynamic contour line where the voltage gains of the two tanks are equal for the current power state.

19 Claims, 19 Drawing Sheets

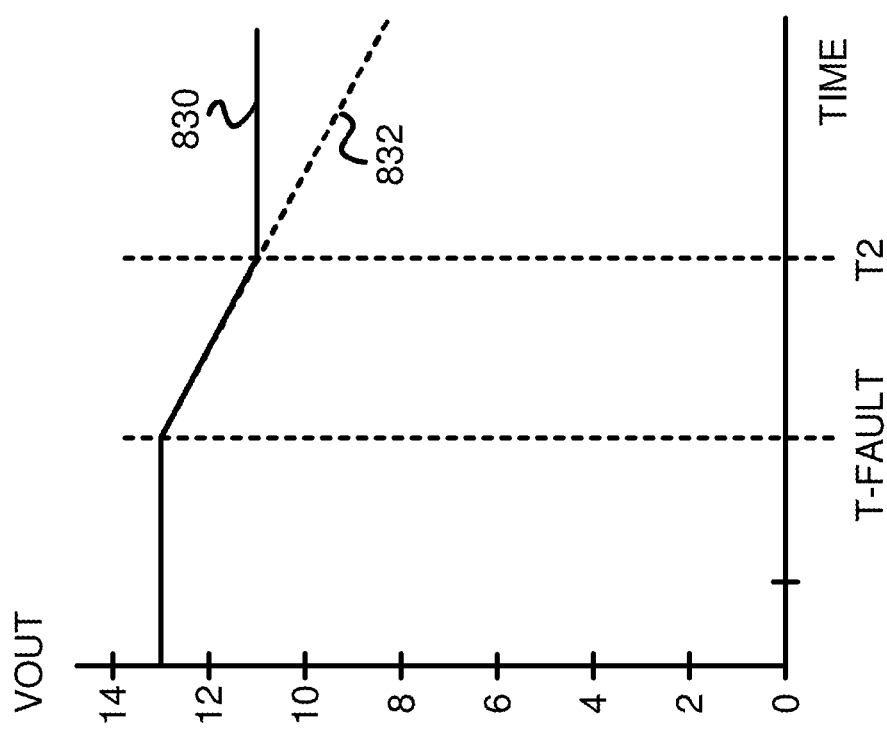

SEAMLESS SWITCHING OF RESONANT TANKS IN POWER CONVERTERS BY MATCHING VOLTAGE GAINS AT TANK SWITCHOVER

FIELD OF THE INVENTION

This invention relates to DC-DC resonant power converters, and more particularly to converters with multiple resonant tanks.

BACKGROUND OF THE INVENTION

Power converters are useful for transportation, telecom, medical, and renewable energy systems, among other applications. High-reliability and fault-tolerant power converters are needed for some applications. A power converter can be used for charging and discharging the battery on an Electric Vehicle (EV), but high efficiency is needed to increase the EV range, such as kilometers per charge. A data center may require a fault-tolerant power converter so that servers continue to be powered when a failure occurs within a power converter.

Older power converters based on earlier Silicon semiconductors can handle large currents but are large and bulky and have a lower efficiency than desired. Newer $3^{rd}$ generation semiconductors (3Gen), such as Gallium Nitride (GaN), can be switched more rapidly, allowing for a more compact, higher efficiency system. However, these newer semiconductor devices (such as 3Gen) tend to be more prone to damage from high currents.

In particular, when a power converter begins operation, known as initialization or start-up, a surge of current into the power-converter's input can occur. This initial current surge, known as the inrush current, is defined as the instantaneous high input current drawn at turn-on. This inrush current can be so high as to damage the newer semiconductor devices (such as 3Gen) that the inrush current passes through.

DC-DC power converters convert one Direct-Current (DC) voltage to a different DC voltage. Isolation of the input and output DC voltages may be achieved by using a transformer that converts an Alternating Current (AC) on the primary side of the transformer to another AC current on the secondary side. Transistors can rapidly modulate the input DC voltage to charge or energize a resonant circuit that includes the primary windings of the transformer, creating the primary-side AC current from the DC input. A rectifier circuit on the secondary side can convert the AC current coupled through the transformer to charge an output capacitor and create the output DC voltage.

The primary windings of the transformer act as an inductor, and a capacitor and perhaps another inductor can be added to the primary-side current loop to form a resonant tank circuit. The capacitance and inductance values can be selected for a desired switching frequency of the input transistors to improve efficiency. These DC-DC power converters are known as resonant power converters.

Resonant converters can draw a large inrush current at start-up, causing damage to the transistors that modulate the DC input voltage. Transistors constructed from newer technologies are especially susceptible to damage. 3Gen transistors in particular tend to have a low inrush current rating, requiring the use of resonant tanks with lower magnetic ratios (m ratio) that lower the efficiency of the power converter.

Voltage sag on the input voltage can occur due to disturbances in the line voltage, requiring a voltage-gain boost to compensate. Power converters with larger voltage gain margin (Maximum voltage-gain–minimum voltage-gain for a particular tank) can quickly respond and supply a voltage boost, but these high-voltage-gain margin converters have a lower efficiency than do lower voltage-gain margin converters. There is a trade-off between high inrush-current, low voltage-gain margin, higher efficiency, and low inrush-current, high voltage-gain margin, and lower efficiency for resonant power converters.

Data centers may use multiple power converters in parallel, each having a transformer and rectifier driving an output. A current sharing or load-balancing circuit then combines the currents from the parallel converters to drive the data center load. However, the individual power converters are designed for peak efficiency when driving at 50% of the design load, so when 2 parallel converters drive the same load, each is driving only a 25% load, and efficiency is reduced. The current sharing circuits tend to be complex and introduce new points of failure. It would be better to use a single power converter to avoid using a current sharing or load-balancing circuit.

A single power converter can have more than one resonant tank circuit that drive the same primary windings of the transformer in parallel. The two resonant tanks can have different electrical characteristics such as magnetic ratios (m ratio) and Quality factors (Q). When a predetermined voltage or current is reached, the tanks can be switched. However, the voltage gain of the 2 tanks may not be equal at this predetermined voltage or current, causing a sudden voltage change on the output as the tanks are switched. This sudden voltage change can cause a current spike during tank switchover and is undesirable. Such sudden current spike and voltage derivation would stress switching transistors and resonant tank components, hence reducing their life expectancy.

What is desired is a resonant power converter having multiple tanks that are cascaded together rather than in parallel. It is desirable to have a start-up tank that is tuned for a lower in-rush current at the cost of lower efficiency, and a second tank for a higher efficiency but without needing to handle the high in-rush current at start-up. It is desired to seamlessly switch tanks without a sudden change in output voltage. Tank switchover without a current spike and voltage deviation is desirable.

BRIEF DESCRIPTION OF THE DRAWINGS

FIG. 17 shows recovery from a failure in the efficiency tank.

DETAILED DESCRIPTION

The present invention relates to an improvement in resonant power converters. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors realize that having two resonant tanks in parallel to the transformer is wasteful since large components such as the inductor and capacitor are needed for each tank. Having multiple indictors and capacitors from the two tanks creates self-resonant and inter-tank-oscillation issues that can affect operation and complicate design.

The inventors propose to share components among the two tanks. Rather than being connected in parallel, the two tanks are cascaded together. The inductor and capacitor for the first tank are also used by the second tank. Thus the additional inductor and capacitor in the second tank do not have to be as large since the inductances of the second tank are added to the inductances of the first tank. The size of the second tank's inductor are the incremental difference between the two tanks' L values, not the full size L values. Thus a smaller inductor can be used for the second tank when the tanks are cascaded together rather than in parallel.

The first resonant tank is designed to have a high efficiency but a lower current and poor voltage regulation. This first resonant tank is referred to herein as the "efficiency tank" and is used during normal steady-state operation when a small magnetizing current is needed.

The second resonant tank is designed to have a higher current but has a lower efficiency. The second resonant tank has better voltage regulation. This better voltage regulation is useful at start-up or when a voltage sag occurs. This second tank is referred to herein as the "auxiliary tank".

Figure 1:
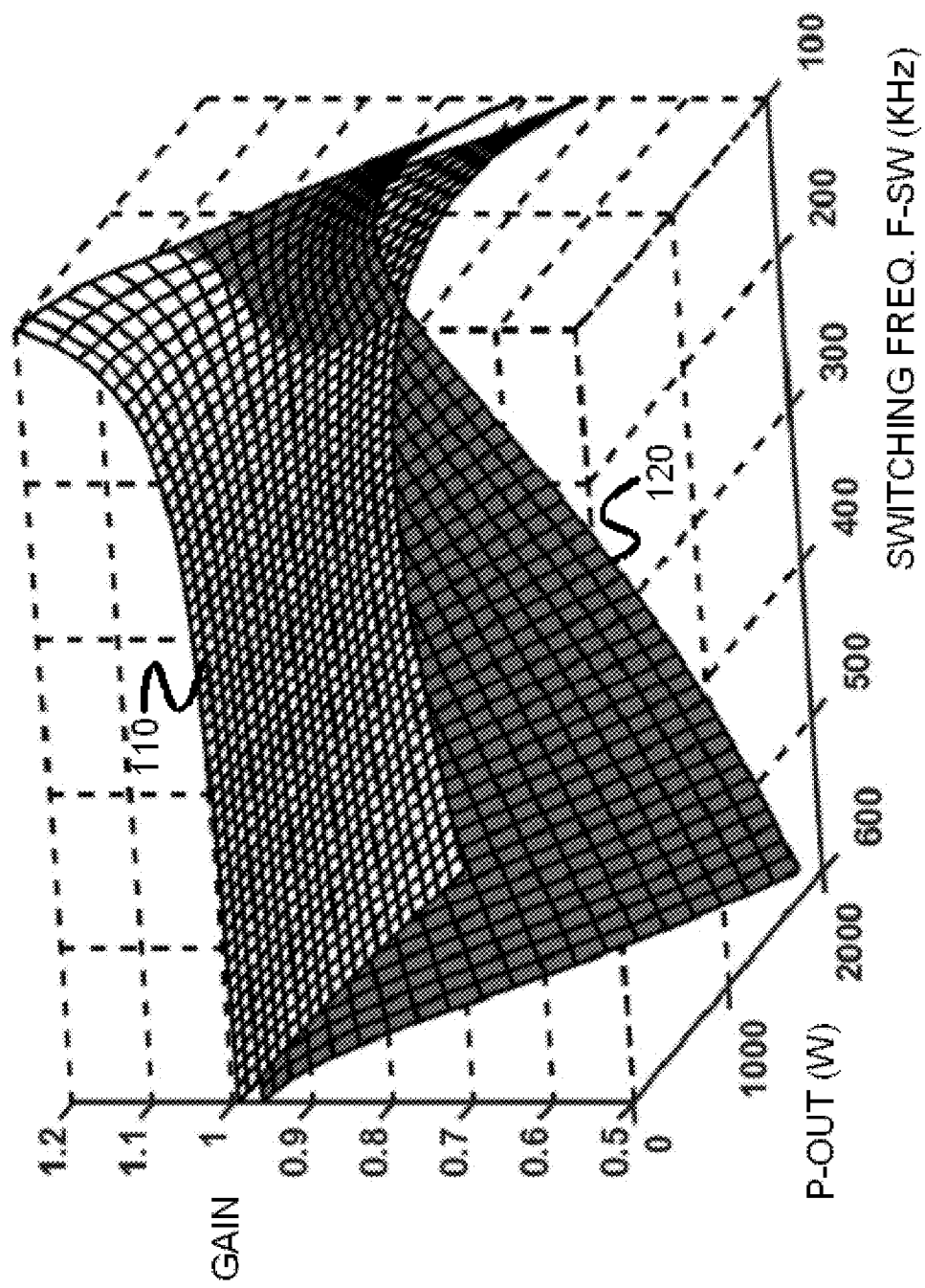
FIG. 1 shows the gain-power-frequency characteristics of the efficiency tank and of the auxiliary tank.

FIG. 1 shows the gain-power-frequency characteristics of the efficiency tank and of the auxiliary tank. The inductance (L) and capacitance (C) values of the efficiency tank are selected during design to provide high efficiency at the cost of lower current and poor voltage regulation. The voltage gain of the two tanks are plotted as a function of the switching frequency of the signals applied to the gates of the transistors that modulate the DC input voltage and the output power characteristics.

Efficiency-tank contour 110 is relatively flat, having a gain of about 1 for most frequencies above 200 kHz. Operating near unity gain allows the efficiency tank to operate at a high efficiency, with a wide frequency range but a large boost current for any given output power. Below 200 kHz, efficiency-tank contour 110 has a noticeably higher gain at low power, and a gain drop-off at high power.

Auxiliary-tank contour 120 deviates from unity gain much more dramatically than does efficiency-tank contour 110. Auxiliary-tank contour 120 has a much lower voltage gain at high frequency and high power. This gain drop off allows the converter to use the auxiliary tank to regulate the output voltage with a narrower frequency range. At start-up, a high frequency can be applied to the auxiliary tank to provide a large current (power) to the system load to more quickly initialize the system.

At frequencies below 200 kHz, auxiliary-tank contour 120 also has noticeably higher gain at high power, and a gain drop-off at low power. Auxiliary-tank contour 120 has much more of a curve or bend, especially at high power (2000 W), than does efficiency-tank contour 110. The auxiliary tank can be more responsive to voltage deviations or voltage sag since its voltage gain (auxiliary-tank contour 120) varies much more than does efficiency-tank contour 110. Thus the auxiliary tank has electrical characteristics that are better suited for start up or for responding to voltage sag than does the efficiency tank.

Figure 2:
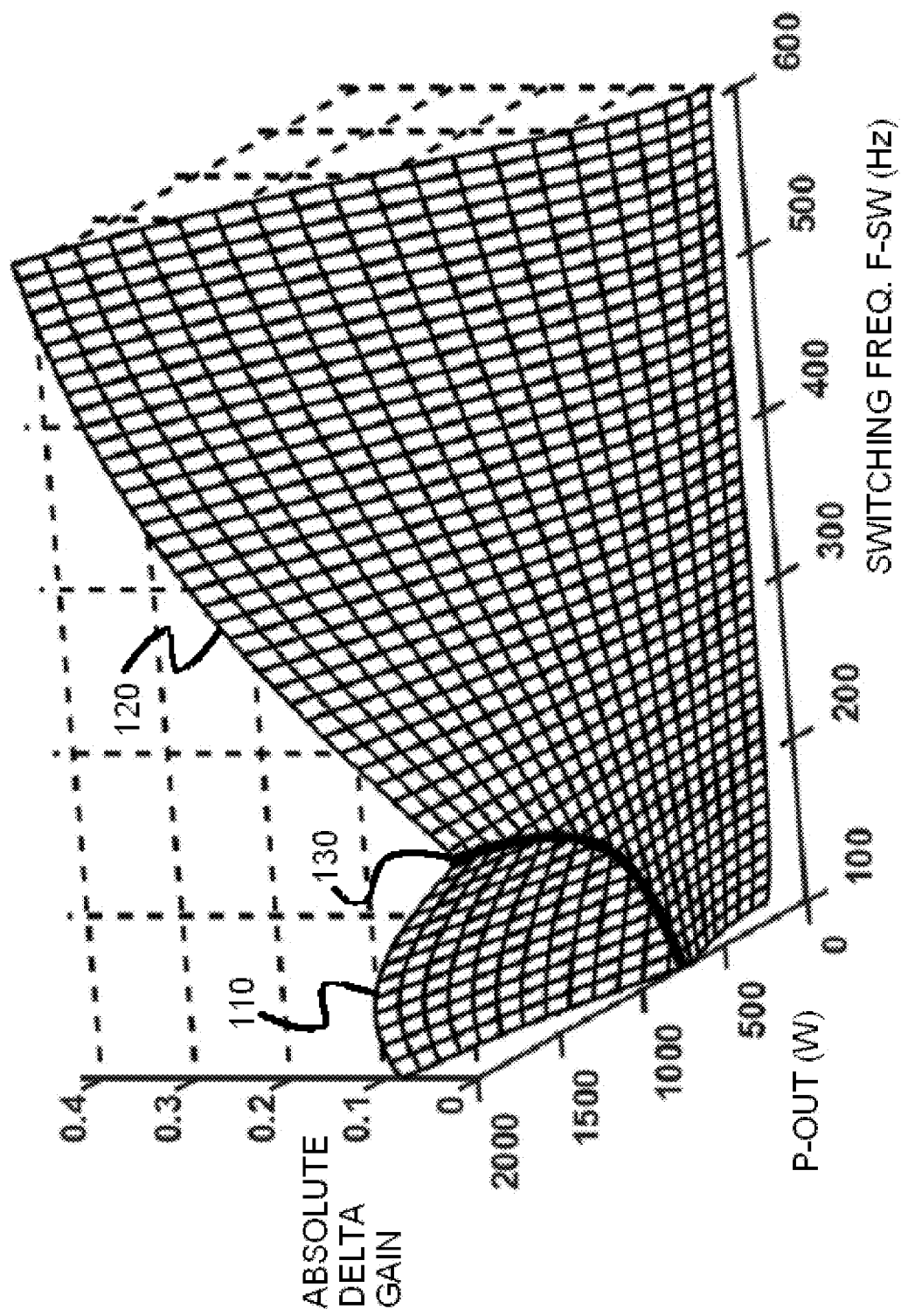
FIG. 2 is a graph showing the intersection of the efficiency-tank contour and the auxiliary-tank contour at the optimal intercepting contour.

FIG. 2 is a graph showing the optimal intersection contour of the efficiency-tank and the auxiliary-tank gain curve. In this plot, the difference in gains or delta gain between the two tanks is plotted as the y axis rather than the absolute voltage gain. The delta gain is the absolute difference in y values of efficiency-tank contour 110 and auxiliary-tank contour 120 of FIG. 1. This difference in voltage gain is greatest at high power, high frequency (2000 W, 600 kHz) in FIG. 1, which shows as the large peak in auxiliary-tank contour 120 on the back right of FIG. 2, at high power, high frequency. Note that the direction of the x axis is reversed in FIG. 2 to better see the intersection of the two contours 110, 120.

The delta gain of auxiliary-tank contour 120 drops from the back right toward the front and left, indicating that the voltage gains of the two tanks are approaching each other. At optimal intercepting contour 130, the delta gain is zero, indicating that the voltage gain of the auxiliary tank is equal to the voltage gain of the efficiency tank.

At high power and low frequency, such as 2000 W and 100 kHz, the efficiency tank has a lower voltage gain than does the auxiliary tank, so efficiency-tank contour 110 shows a peak at 2000 W, 100 kHz.

The inventors have realized that tank switchover has an undesirable current spike when the output voltage suddenly changes at switchover. The output voltage must change when the voltage gain of the two tanks are not equal. When the new tank has a different voltage gain than does the old tank, and the input voltage remains constant, then output voltage must suddenly change to a new value, the input voltage multiplied by the new voltage gain.

The inventors realize that this output voltage change at switchover can be avoided if the voltage gain of the two tanks are equal at switchover. This equality of the voltage gain of the two tanks is represented by optimal intercepting contour 130, where the delta gain value is zero.

The inventors have developed a method to detect when optimal intercepting contour 130 has been reached, and then switch tanks while the system is at an operating point along optimal intercepting contour 130. Since the delta gain is zero, the voltage gains of the two tanks are equal, so no change in the output voltage occurs at switchover. Without an output voltage change, there is no current spike at switchover. The system seamlessly switches from the auxiliary tank to the efficiency tank at optimal intercepting contour 130.

Figure 3:
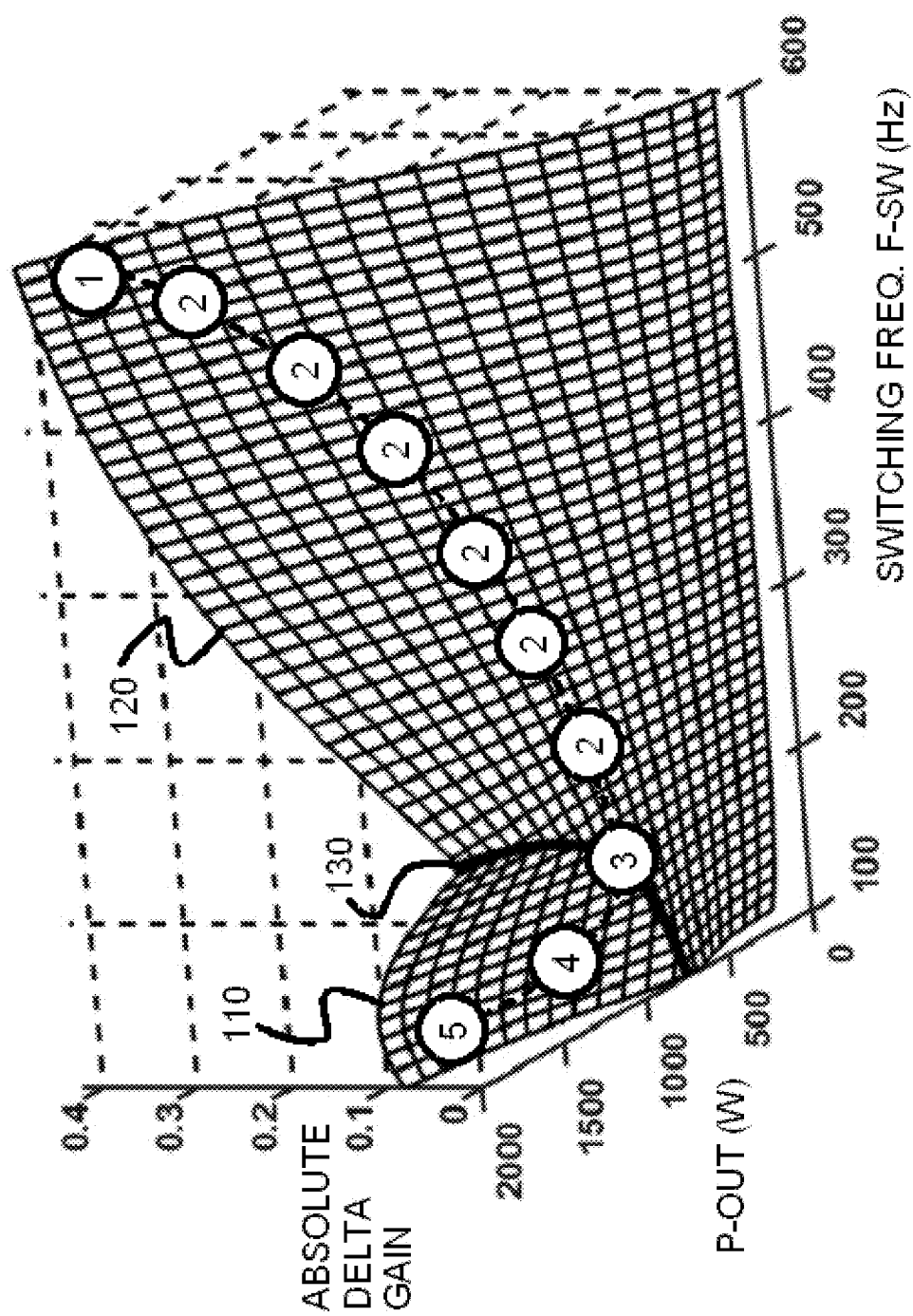
FIG. 3 highlights state transitions along the auxiliary-tank contour with switchover to the efficiency-tank contour at the optimal intercepting contour.

FIG. 3 highlights state transitions along the auxiliary-tank contour with switchover to the efficiency-tank contour at the optimal intercepting contour. When power is first applied to the power converter, a high frequency such as 600 kHz is applied to the modulation transistors that drive the auxiliary tank. The modulation transistors that drive the efficiency tank are disabled. Since the auxiliary tank is cascaded into the efficiency tank, the inductors and capacitors in the efficiency tank are used by the auxiliary tank for a larger combined inductance and capacitance. The high switching frequency applied to the auxiliary tank provides a high power, such as shown for initial state 1 located near the top of auxiliary-tank contour 120. A large delta gain occurs for initial state 1.

After some time, the present system state is observed, such as by sampling the input and output voltages, and determining the power from the output current and output voltage. The power is likely decreasing as the system load is powered up, and the switching frequency can be reduced by a controller as the power and delta voltage gain decline. The system transitions to auxiliary state 2. As the system continues to stabilize and power and delta gain are reduced, the controller again lowers the switching frequency and another auxiliary state 2 is entered. A series of successive auxiliary states 2 along auxiliary-tank contour 120 are entered as the controller continues to step down the switching frequency and power draw is reduced. The exact path of these auxiliary state 2's taken along auxiliary-tank contour 120 can vary with conditions such as system loads switching on and off at different times, and more time may elapse for some of the auxiliary state 2's, such as when loading increases, than for other auxiliary state 2's.

Eventually the auxiliary-tank gain approaches the gain that the efficiency tank would have for these conditions of power and frequency. The delta gain, or gain difference between the auxiliary and efficiency tanks, decreases until the calculated gains match, at optimal intercepting contour 130. When a state that is along optimal intercepting contour 130 is reached, such as switchover state 3, then the tanks are switched. The same switching frequency that was applied to the modulation transistors of the auxiliary tank is applied to the efficiency tank transistors. The modulation transistors for the auxiliary tank stop switching. Thus the efficiency tank is switched on and the auxiliary tank is switched off.

Since the same switching frequency is used for both tanks, and the voltage gain of both tanks are equal since the delta gain is zero along optimal intercepting contour 130, and the power of the load can be considered to remain constant for the relatively short time to switch tanks, the power converter seamlessly switches tanks with no change in output voltage. The electrical characteristics of the two tanks are equal at the switchover point, minimizing any system disturbance.

After switchover state 3, the auxiliary tank is no longer operating, but the efficiency tank is operating. The efficiency tank begins operation. The present system states are observed, such as by sampling the input and output voltages and comparing the measured voltage gain with the expected voltage gain. The gain of efficiency tank starts to change and is farther from the gain of auxiliary tank, so the absolute delta gain increases. One or more efficiency states 4 may occur along efficiency-tank contour 110. Finally steady state 5 is reached. The efficiency tank reaches the targeted gain value so that the output voltage can be regulated to the target value. The absolute delta gain is higher at steady state 5 than at intermediate state 4 since the gain of the efficiency tank is farther from the gain of auxiliary tank for these operating conditions of low frequency.

The system can trace a variety of paths from initial state 1 to steady state 5. The switching frequency can gradually be reduced as the system powers up, and several auxiliary states 2 can occur on the path along auxiliary-tank contour 120. Tank switchover is performed when switchover state 3 is detected on optimal intercepting contour 130. Then one or more efficiency states 4 occur along efficiency-tank contour 110 until steady state 5 is reached.

The paths of auxiliary states 2 may reach optimal intercepting contour 130 at different points along optimal intercepting contour 130 representing different combinations of switching frequency and power. Each power up may be different and have different loading at different time points, resulting in different paths along auxiliary-tank contour 120. By detecting optimal intercepting contour 130, rather than a fixed voltage point, the power converter has flexibility and can adapt to different loading conditions and power up sequences that can occur for complex real-world system loads.

Inrush current spikes are reduced, protecting next-generation semiconductor devices from damage, since tank switchover occurs along optimal intercepting contour 130 where the voltage gains are matched among the two tanks, preventing voltage and current spikes at switchover. The system operates in a steady fashion since voltage deviations at switchover are avoided by matching voltage gains of the tanks at the switchover point. A smaller inrush current is attained by the auxiliary tank at start-up, while a smaller magnetizing circulating current is attained by the efficiency tank after switchover.

Figure 4:
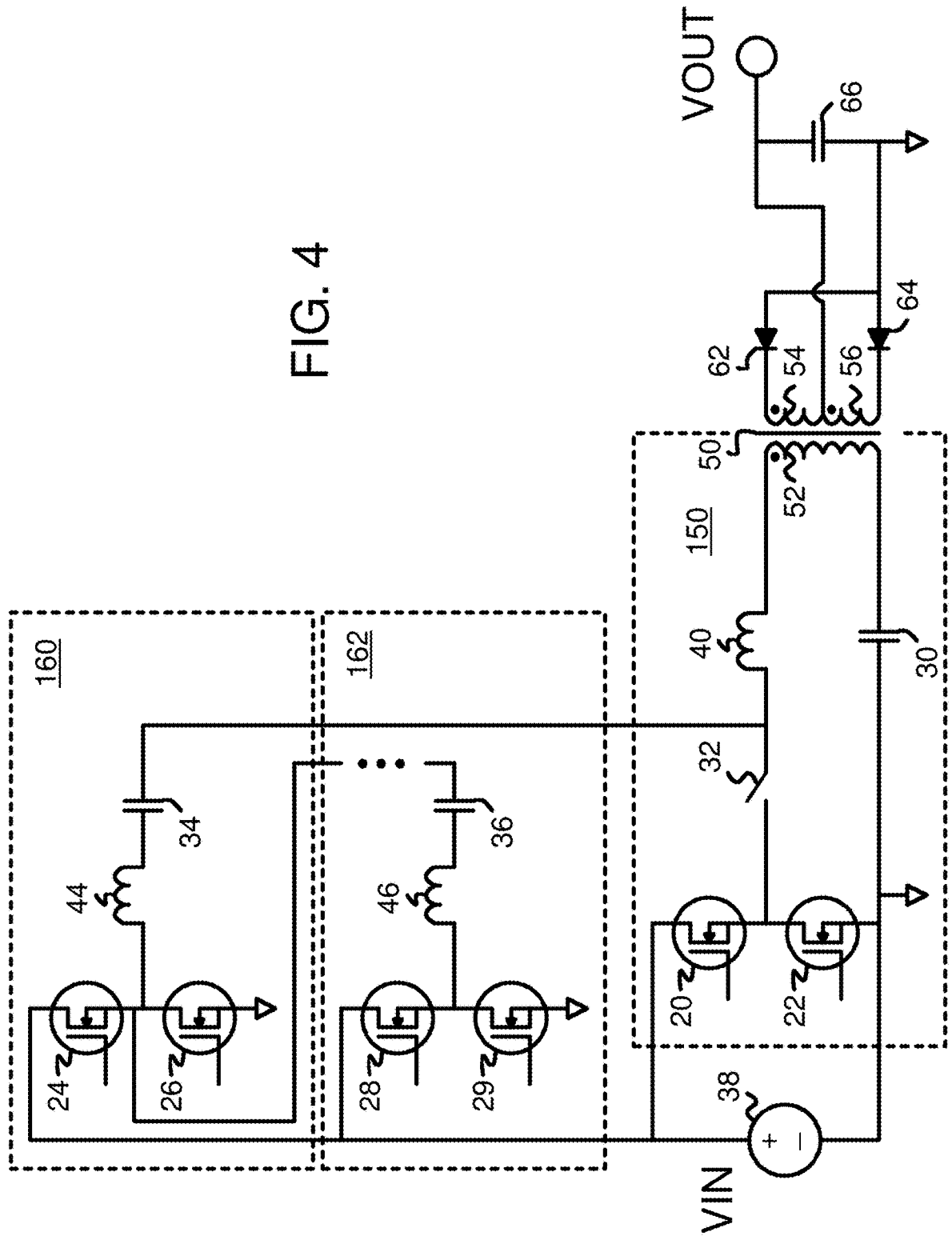
FIG. 4 is a circuit diagram of cascaded tanks in a resonant power converter.

FIG. 4 is a circuit diagram of cascaded tanks in a resonant power converter. A DC input voltage VIN is provided by voltage source 38 and is applied to resonant tanks 160, 162, 150 that are cascaded together.

Efficiency tank 150 has a current loop through primary windings 52 of transformer 50. This current loop includes resonant capacitor 30, the magnetizing inductance of primary windings 52, and leakage inductor 40. When switch 32 is closed and alternating signals with the switching frequency are applied to the gates of modulation transistors 20, 22, resonant capacitor 30 is charged from VIN through modulation transistor 20, switch 32, leakage inductor 40, primary windings 52, and discharged by modulation transistor 22 through switch 32, leakage inductor 40, and primary windings 52. The switching signals applied to the gates of modulation transistors 20, 22 are complements or non-overlapping pulses so that only one of modulation transistors 20, 22 is on and the other is off at any time.

Efficiency tank 150 can have a higher magnetic (m) ratio than do auxiliary tanks 160, 162 since resonant inductors 44, 46 are in series with leakage inductor 40, increasing Lr and decreasing m=Lm/Lr, wherein Lm is the inductance of primary windings 52 and Lr is the sum of other inductances in series with Lm.

Since efficiency tank 150 has a higher m ratio than does auxiliary tanks 160, 162 cascaded with efficiency tank 150, when only efficiency tank 150 is operating, the proportion of magnetizing inductance is higher, resulting in a small magnetizing circulating current through the transformer 50, causing decreased circulating energy and better efficiency.

When the switching frequency is applied to one or more of auxiliary tanks 160, 162 rather than to efficiency tank 150, then the series resonant inductance Lr is higher, since Lr is the sum of the inductances of resonant inductors 44, 46 and leakage inductor 40. The higher Lr results in a lower m ratio, with less energy coupled through transformer 50 for a given loop current, and therefore less efficiency. However, a higher gain can provide a smaller inrush current and better regulation, which is ideal for start-up or recovering from input voltage sag.

In a typical control scheme, the switching frequency is applied to only one tank at any time. The gates of the switching transistors for the other tanks are not pulsed and remain in a disabling state, such as ground. For example, when better regulation is desired to compensate for voltage sag, the switching signals are applied to the gates of transistors 24, 26, while the gates of transistors 28, 29, and 20, 22 are grounded. The switching signal on the gate of transistor 24 is the complement of the switching signal applied to the gate of transistor 26 so that transistor 24 is on and transistor 26 is off for the high pulse width, charging capacitor 34 through resonant inductor 44. During the low pulse width, transistor 24 is off and transistor 26 is on, discharging capacitor 34 through resonant inductor 44.

Since capacitor 34 is coupled to leakage inductor 40 in efficiency tank 150, current is coupled into primary windings 52 as capacitor 34 is charged and discharged by the switching frequency applied to transistors 24, 26. The loop current through primary windings 52 induces a current in secondary windings 54, 56 through transformer 50. As the primary current alternates in direction, the induced current in secondary windings 54, 56 also change direction.

This cascaded resonant tanks topology conserves the energy stored in resonant components 30, 40, 34, 44, 36, 46 when switching between tanks. In particular, this common capacitor architecture eliminates the necessity to energize all of the resonant capacitors along the current loop when switching tanks, hence further suppresses switchover stress.

When the induced secondary current flows upward in secondary windings 54, 56, current from ground flows through diode 64 into secondary windings 54, 56 but is blocked by diode 62, forcing the induced current to the output VOUT to charge output capacitor 66. When the induced secondary current flows downward in secondary windings 54, 56, current from ground flows through diode 62 into secondary windings 54, 56 but is blocked by diode 64, forcing the induced current to the output VOUT to charge output capacitor 66.

At steady state, when high efficiency is desired, the gates of transistors 24, 26 and 28, 29 are grounded, while the switching signals are applied to the gates of transistors 20, 22 in efficiency tank 150. Since no current flows through resonant inductors 44, 46, they are effectively removed from the circuit, and Lr only includes leakage inductor 40, not resonant inductors 44, 46. The m ratio rises and efficiency increases.

Switch 32 remains closed for normal operation and is open when a fault is detected in transistors 20, 22. Switch 32 allows transistors 20, 22 to be isolated during fault handling, as described later in FIGS. 11, 15A.

When a smaller inrush current is desired, such as at start up, the switching signals are applied to transistors 28, 29 in auxiliary tank 162, while transistors 24, 26 and 20, 22 are grounded. Then auxiliary tanks 160, 162 and efficiency tank 150 are all cascaded together. Transistors 28, 29 pump current in and out of capacitor 36 through resonant inductor 46. Since capacitor 36 is also coupled to downstream tanks, such as auxiliary tank 160, the pumping action on capacitor 36 also coupled to capacitor 34 through resonant inductor 44, and then through leakage inductor 40 to primary windings 52 and to resonant capacitor 30.

When transistors 28, 29 in auxiliary tank 162 are being switched, the converter forms a LCLCLLC resonator with the lowest m ratio due to having 3 L's (resonant inductors 44, 46, and leakage inductor 40) in series with transformer 50.

When transistors 24, 26 in auxiliary tank 160 are being switched, the converter forms a LCLLC resonator with an intermediate m ratio due to having 2 L's (resonant inductor 44 and leakage inductor 40) in series with transformer 50.

When transistors 20, 22 in efficiency tank 150 are being switched, the converter forms a LLC resonator with the highest m ratio due to having only 1 L (leakage inductor 40) in series with transformer 50.

The capacitance value of capacitor 34 can be selected to match resonant inductor 44 to obtain efficient resonance at the desired range of switching frequencies applied to transistors 24, 26. Likewise, the capacitance value of capacitor 36 can be selected to match resonant inductor 46 for the desired range of switching frequencies applied to transistors 28, 29. The capacitance value of capacitor 30 can be selected to match leakage inductor 40 and the inductance of primary windings 52 for the desired range of switching frequencies applied to transistors 20, 22.

Figure 5:
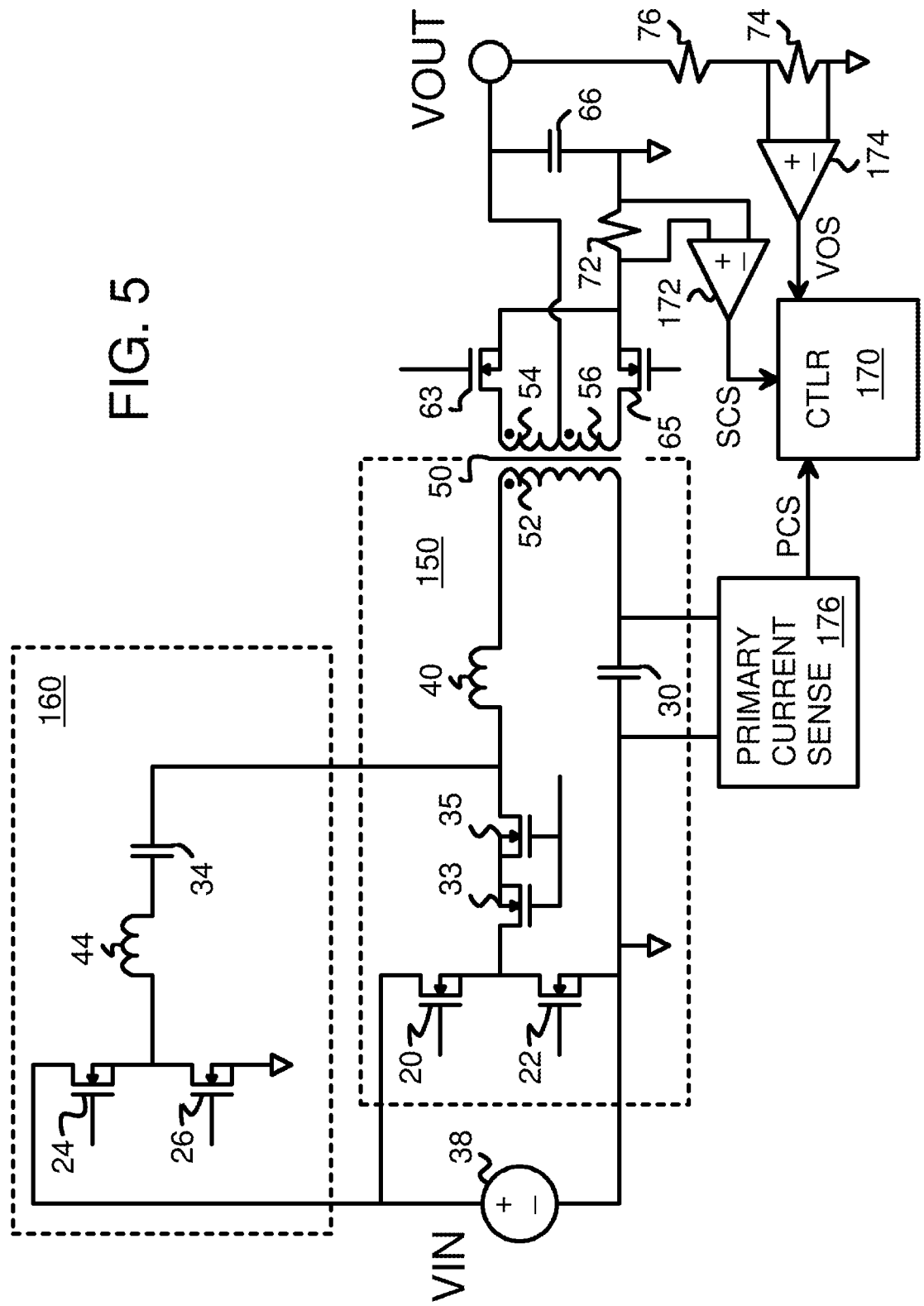
FIG. 5 is a diagram of a 2-tank cascaded power converter highlighting current and voltage sensing to the controller.

FIG. 5 is a diagram of a 2-tank cascaded power converter highlighting current and voltage sensing to the controller. In this embodiment, only one auxiliary tank 160 is cascaded with efficiency tank 150. Switch 32 (FIG. 4) is implemented by isolation transistors 33, 35 in series that have their substrate or bulk nodes connected together and isolated from switching transistors 20, 22 and from leakage inductor 40. Diodes 62, 64 (FIG. 4) on the secondary are implemented by transistors 63, 65.

The output power is calculated by controller 170 by multiplying the output current with the output voltage. The output current is measured as the current flowing through resistor 72 that is connected to the secondary ground and transistors 63, 65. All the secondary current flowing through secondary windings 54, 56 flows through resistor 72. The voltage drop across resistor 72 is sensed by detector 172 to generate the Secondary Current Sense (SCS) value that is input to controller 170.

The output voltage is sensed by detector 174 as the Voltage Output Sense (VOS) signal read by controller 170. Detector 174 senses the voltage drop across resistor 74, which along with resistor 76 forms a voltage divider between output voltage VOS and the secondary ground. Controller 170 can multiply VOS with SCS to obtain the output power currently being drawn by the load system. VOS and SCS may be scaled or calibrated by controller 170 or by other circuits or routines.

The primary current is sensed across resonant capacitor 30 by primary current sensor 176. The circuitry of primary current sensor 176 is shown later in FIG. 8. Primary current sensor 176 generates a Primary Current Sense (PCS) signal or value to controller 170 that indicates the primary current or allows controller 170 to calculate or estimate the primary current. Controller 170 can calculate the voltage gain using PCS, SCS, and VOS, along with the input voltage VIN. PCS can help to determine whether the power converter is operating in resonant, above resonant, or below resonant states. Voltage gain can be calculated as VOUT/VIN. VIN is not necessary constant. The output power can be calculated as Vout*Iout.

Controller 170 monitors the present state of the system and adjusts the switching frequency or duty cycle to change states, such as for the series of auxiliary states 2 shown in FIG. 3. Controller 170 determines the output power and voltage gain from the sensor data (VOS, SCS, PCS), and controls the switching frequency applied to transistors 20, 22 or to transistors 24, 26.

Since controller 170 obtains the output power, voltage gain, and switching frequency, controller 170 has all three data points of FIG. 3 to determine the present state of the current tank. The voltage gains of both tanks can be pre-calculated and used to obtain the delta gain, with all states having a delta-gain of zero being used to pre-define optimal intercepting contour 130. Once controller 170 finds that the current state matches one of the states along optimal intercepting contour 130, then optimal intercepting contour 130 has been reached, and tank switchover may be initiated.

The calculation of voltage gain is very computation intensive. By pre-computing voltage gains to obtain optimal intercepting contour 130, controller 170 avoids calculation of the voltage gain on-the-fly. Furthermore, the many voltage gain combinations for all tanks (FIG. 1) are not stored, reducing memory requirements. Optimal intersecting contour 130 is pre-computed and then stored in memory. Controller 170 only monitors and compares the present state to optimal intercepting contour 130 determine when tank switchover is needed.

Figure 6:
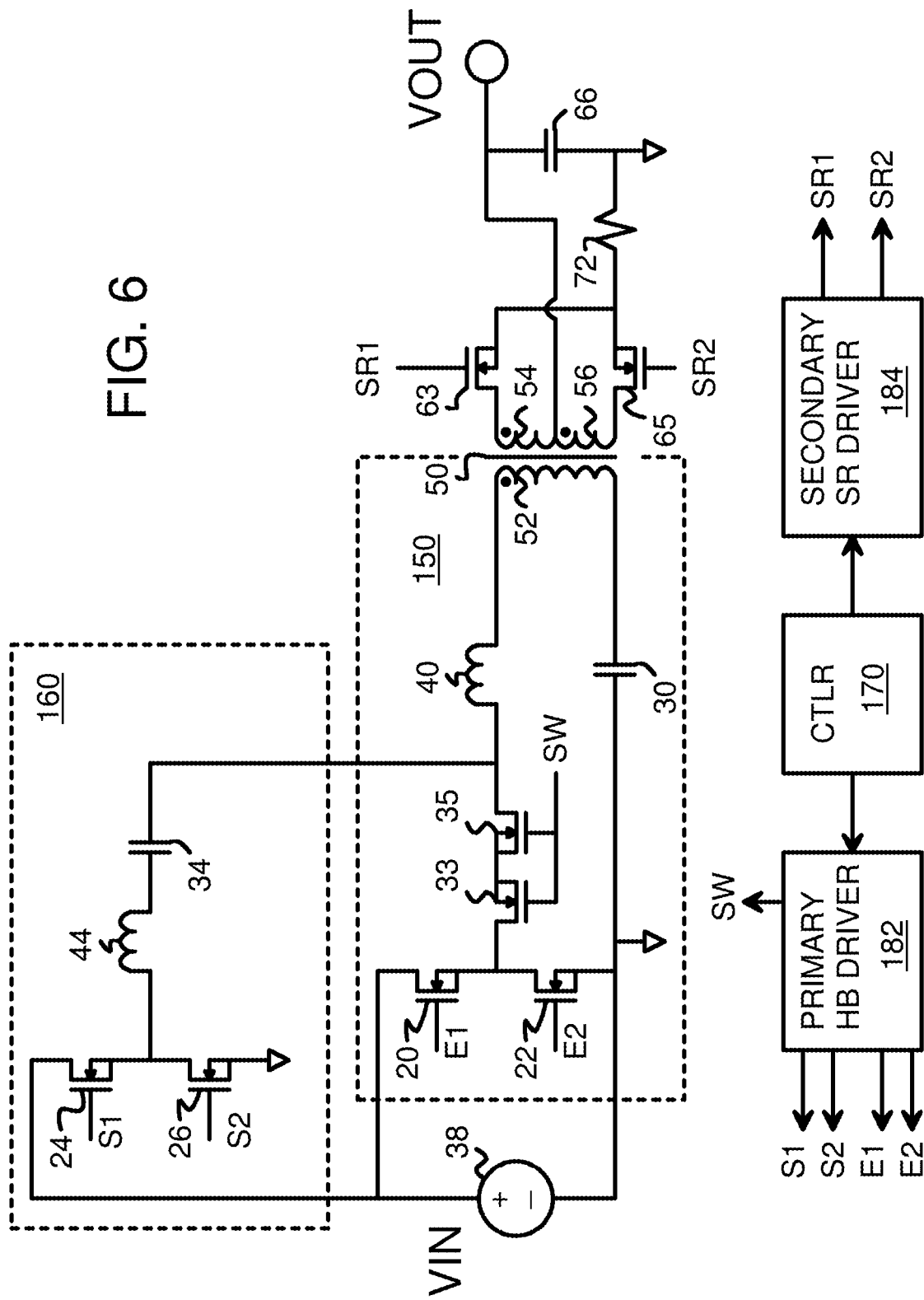
FIG. 6 is a diagram of the 2-tank cascaded power converter highlighting the controller driving the switching signals to control the state of the power converter.

FIG. 6 is a diagram of the 2-tank cascaded power converter highlighting the controller driving the switching signals to control the state of the power converter. Controller 170 determines the present state from the sensor data collected in FIG. 5 and then adjusts the switching signals to move the power converter to a new state.

Controller 170 activates secondary SR driver 184 to generate Synchronous Rectifier (SR) control signals SR1, SR2 to the gates of SR transistors 63, 65, respectively. SR1 and SR2 can be non-overlapping signals or complements of each other. The frequency of the SR control signals can be about the same as the switching frequency of the switching signals applied to the primary-side transistors.

Controller 170 also activates primary Half-Bridge (HB) driver 182 to generate the switching signals to the primary-side switching transistors. Switching signal S1 is applied to the gate of transistor 24 while signal S2 is applied to the gate of transistor 26 in auxiliary tank 160. Switching signal E1 is applied to the gate of transistor 20 while signal E2 is applied to the gate of transistor 22 in efficiency tank 150. When signals S1, S2 are pulsing at the switching frequency, signals E1, E2 remain grounded to cause auxiliary tank 160 to be cascaded with efficiency tank 150. Conversely, when signals E1, E2 are pulsing at the switching frequency, signals S1, S2 remain grounded to cause auxiliary tank 160 to be disabled so that efficiency tank 150 can drive transformer 50. S1 and S2 are complements of each other when pulsing; likewise E1 and E2 are complements of each other when pulsing. These complementary signals can be altered somewhat such as to form non-overlapping complementary pulses.

Isolation transistors 33, 35 have their gates controlled by switch signal SW, which is normally high. When a fault is detected in transistors 20, 22, switch signal SW is driven low to turn off isolation transistors 33, 35 to isolate faulty transistors 20, 22 from transformer 50. This isolation allows transistors 24, 26 in auxiliary tank 160 to be used to drive transformer 50 for fault recovery.

Figure 7:
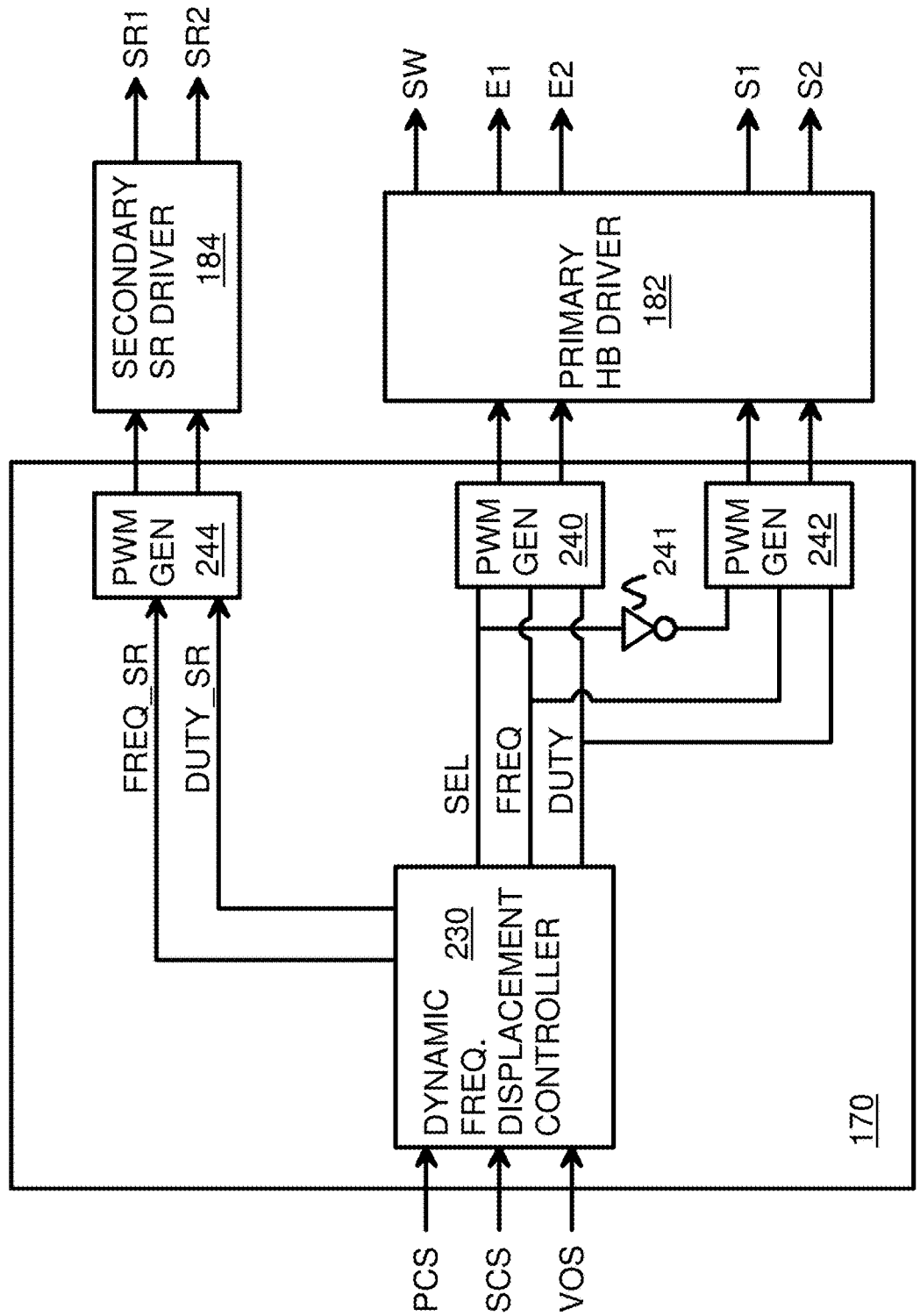
FIG. 7 shows the controller in more detail.

FIG. 7 shows the controller in more detail. Controller 170 receives sensor inputs PCS, SCS, and VOS that sense the primary and secondary currents and the output voltage. Controller 170 uses these sensor input to determine the voltage gain and output power to determine the current state of the power converter. The current state is determined by 3 variables—the voltage gain, power, and the switching frequency. The switching frequency is set by controller 170.

Dynamic frequency displacement controller 230 inside controller 170 tracks the current state, and adjusts the switching frequency to advance to a new state. The switching frequency FREQ is applied to Pulse-Width-Modulation (PWM) generators 240, 242, along with a duty cycle setting DUTY. A tank-select signal SEL is generated high by controller 170 when efficiency tank 150 is selected, and low when auxiliary tank 160 is selected. When SEL is high, PWM generator 240 is enabled and PWM generator 242 is disabled through inverter 241. PWM generator 242 drives both S1, S2 low to disable auxiliary tank 160, while PWM generator 240 generates complementary signals E1, E2 having switching frequency FREQ and a duty cycle DUTY. When SEL is low, PWM generator 242 is enabled and PWM generator 240 is disabled. PWM generator 240 drives both E1, E2 low to disable pulsing of transistors 20, 22 in efficiency tank 150, while PWM generator 242 generates complementary signals S1, S2 having switching frequency FREQ and a duty cycle DUTY, to activate auxiliary tank 160. The S1, S2, E1, E2 signals are buffered by primary HB driver 182.

The secondary-side SR frequency FREQ_SR and duty cycle DUTY_SR are sent by controller 170 and applied to PWM generator 244 to generate signals SR1, SR2, which are buffered by secondary SR driver 184 to drive the gates of SR transistors 63, 65.

Dynamic frequency displacement controller 230 can also adjust the next state by adjusting the effective voltage gain through the duty cycle control DUTY. DUTY is the high pulse width as a percentage of the full cycle. By increasing DUTY, pull-up transistors 20 or 24 remain on longer, increasing the current, charge, and energy inputted into the resonant tank. This increased energy input also increases the power delivered to the load by the secondary side rectifier. The high pulse widths of both complementary signals E1, E2 or S1, S2 are increased equally by DUTY.

When dynamic frequency displacement controller 230 detects that the voltage gain of auxiliary tank 160 is equal to the pre-calculated voltage gain for efficiency tank 150 for the current power and switching frequency, then the delta gain is zero and optimal intercepting contour 130 has been reached. Dynamic frequency displacement controller 230 changes tank select SEL from low to high, causing PWM generator 242 to be disabled and drive S1, S2 low, and causing PWM generator 240 to be activated to begin pulsing E1, E2 with the current switching frequency FREQ and duty cycle DUTY. auxiliary tank 160 is disabled and efficiency tank 150 is the only active tank.

Figure 8:
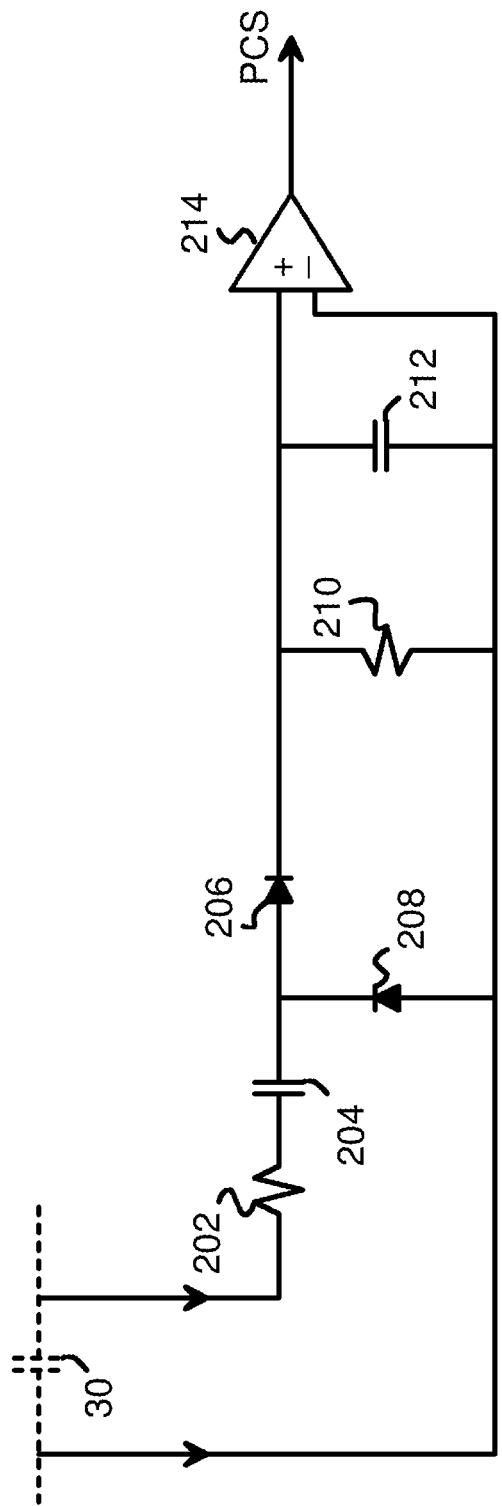
FIG. 8 is a schematic of the primary current sensor.

FIG. 8 is a schematic of the primary current sensor. Primary current sensor 176 senses the AC current through resonant capacitor 30. The pumped side of resonant capacitor 30 is applied directly to the inverting input of comparator 214, while the transformer side of resonant capacitor 30 is connected through resistor 202, capacitor 204, and diode 206 to the non-inverting input of comparator 214. Resistor 210 is coupled across the inputs of comparator 214, and capacitor 212 is also coupled across the inputs of comparator 214. Diode 208 allows current from the inverting input of comparator 214 to flow to the diode side of capacitor 204.

Comparator 214 generates the primary current sense signal PCS that indicates the value of the primary current.

Figure 9B:
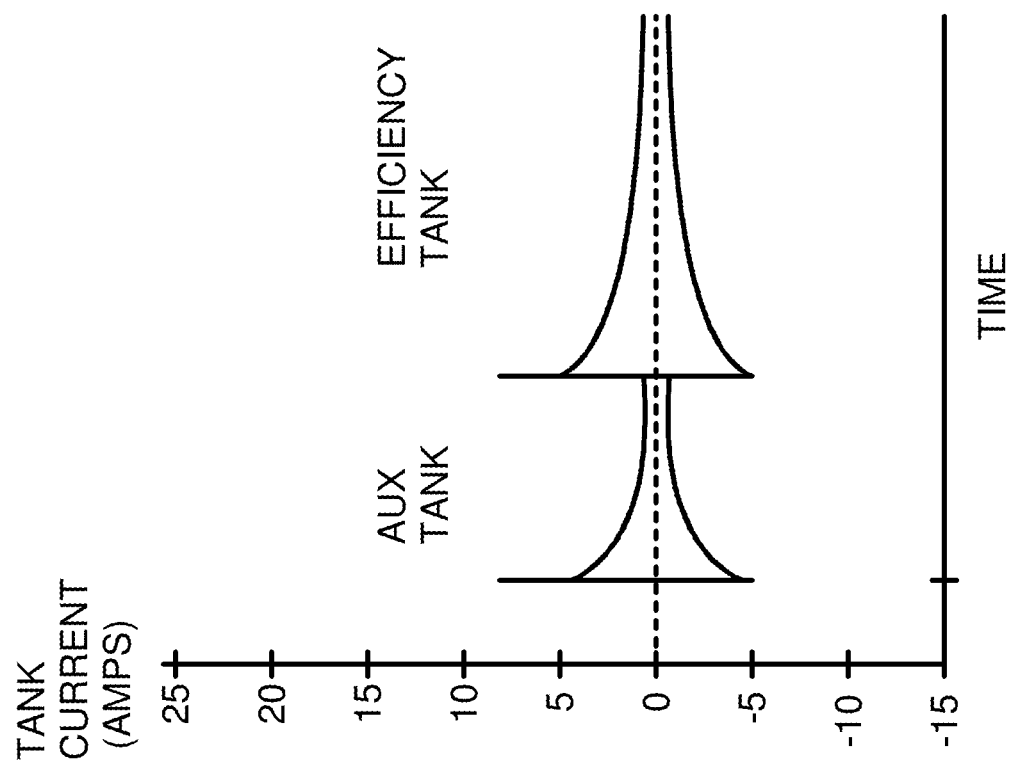
FIGS. 9A-9B are simulated waveforms that show a reduction of inrush current by using cascaded tanks.
Figure 9A:
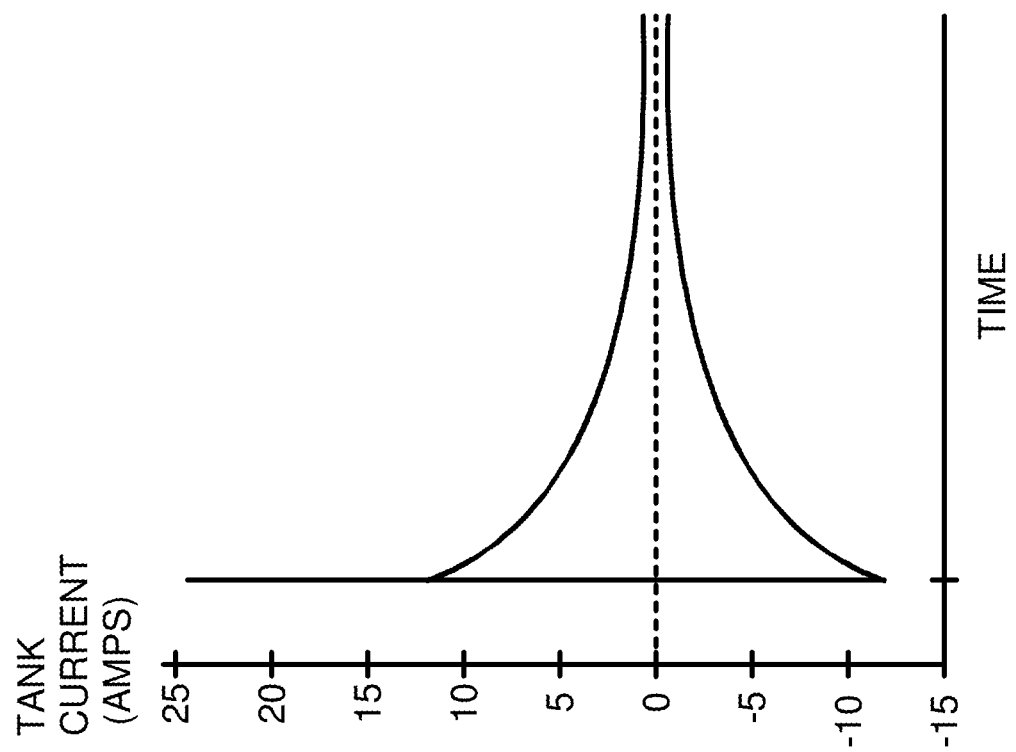

FIGS. 9A-9B are simulated waveforms that show a reduction of inrush current by using cascaded tanks. In FIG. 9A, a power converter has a single tank that is used at all times. At start-up, the initial current surges to +24 amps. Next-generation semiconductor devices may not be able to withstand this large of a current without being damaged.

In FIG. 9B, the auxiliary tank is pulsed and cascaded with the efficiency tank at start up, and after some time the tanks are switched so that the efficiency tank is used without the auxiliary tank. This initial inrush current surge is about +8 amps. Next-generation semiconductor devices should be able to withstand this reduced amount a current without being damaged.

Inrush current is reduced by about ⅔'s in this simulation using the circuit of FIG. 5. The lower voltage gain of about 0.5 of auxiliary-tank contour 120 compared with the voltage gain of about 1.0 for efficiency-tank contour 110 (FIG. 1) at maximum switching frequency and power (600 kHz, 2000 W) that occur at start-up causes the reduction in inrush current due to a combination of factors.

Figure 10A:
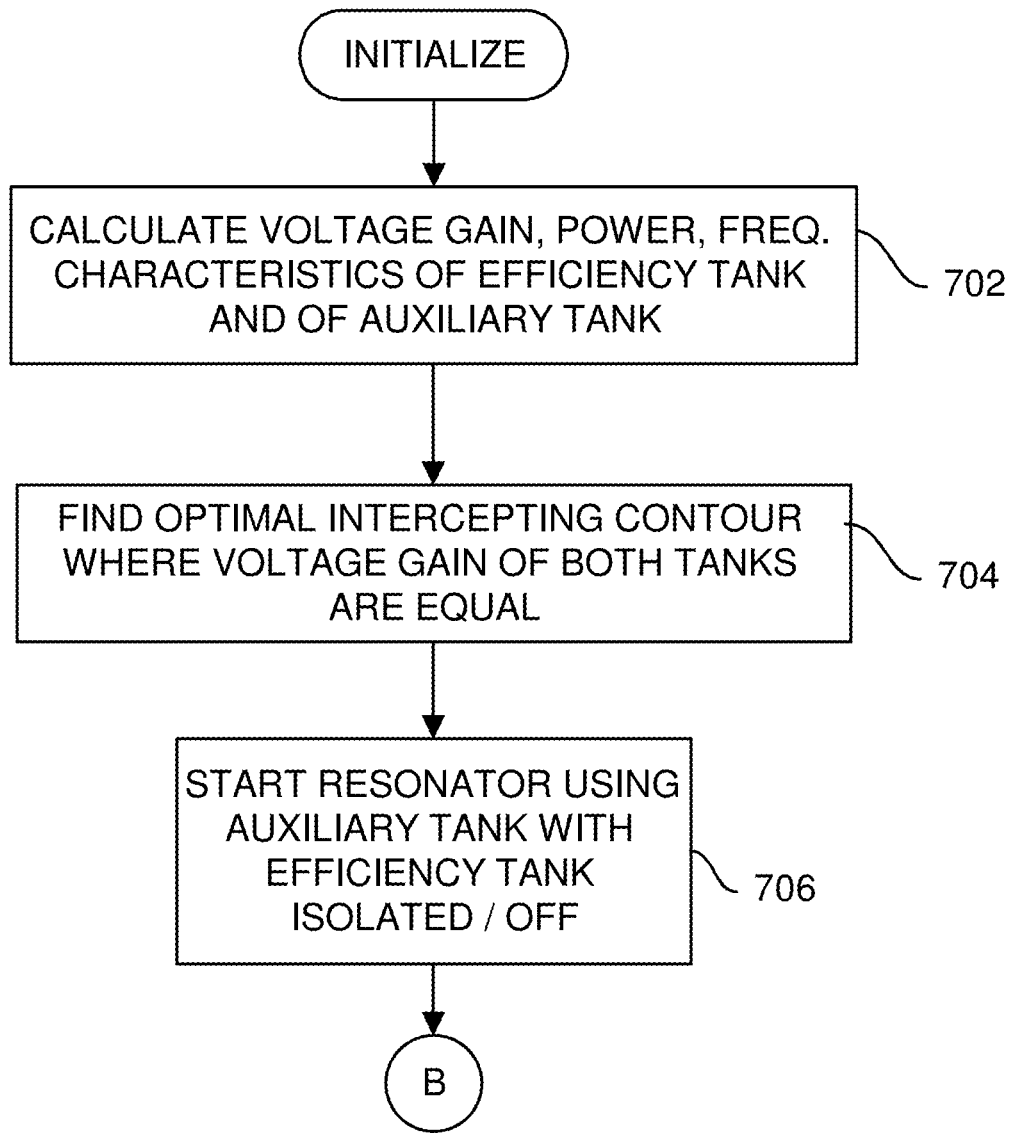
FIGS. 10A-10B are a flowchart of operation of the cascaded-tank power converter from start up to tank switchover at the optimal intercepting contour.
Figure 10B:
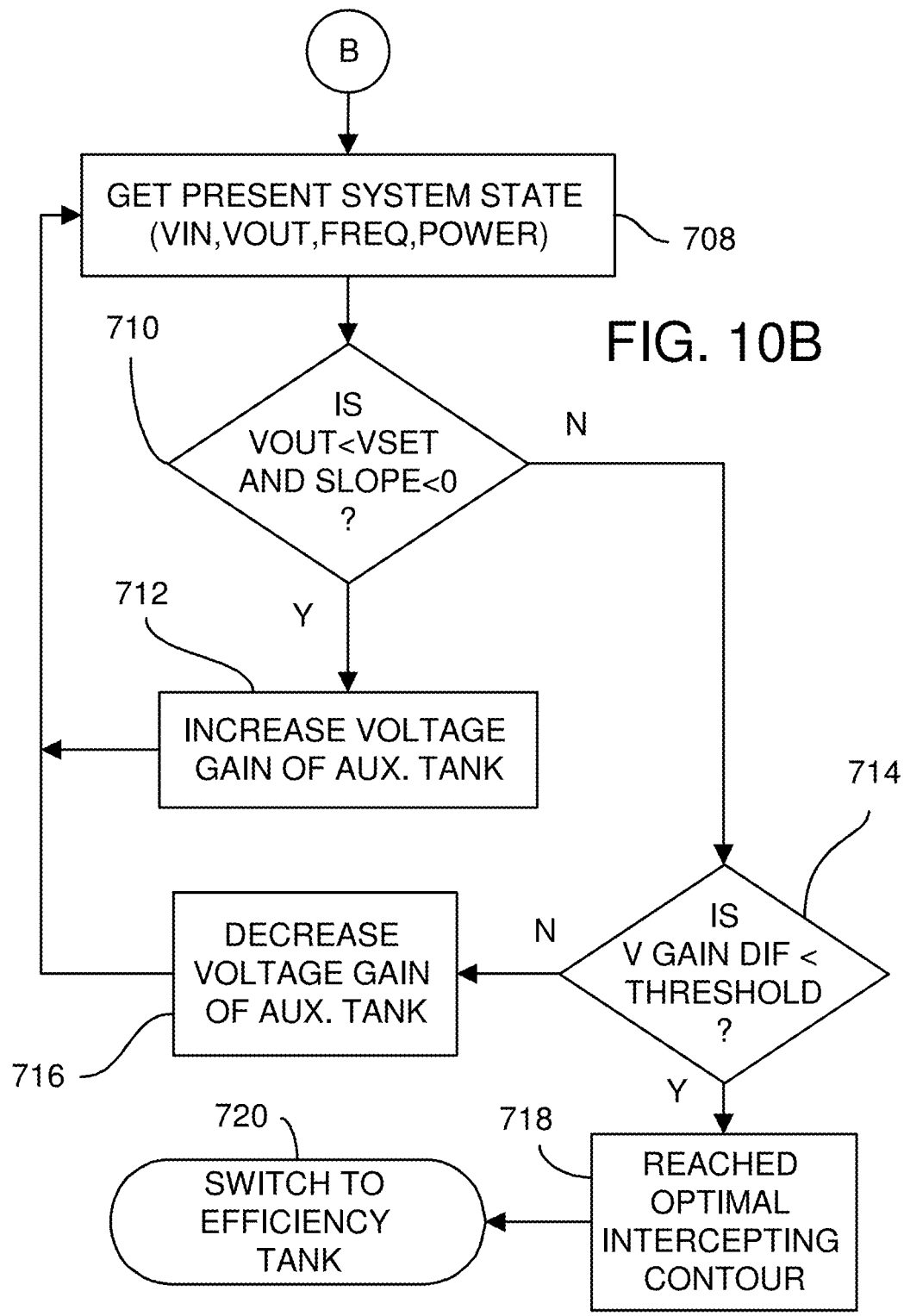

FIGS. 10A-10B are a flowchart of operation of the cascaded-tank power converter from start up to tank switchover at the optimal intercepting contour. This process can be implemented by dynamic frequency displacement controller 230 in controller 170 (FIG. 7).

Upon start-up, power-up, initialization, or reset, the controller calculates the voltage gain, output power, and switching frequency characteristics for the efficiency tank and for the auxiliary tank, step 702. These characteristics are shown by efficiency-tank contour 110 and auxiliary-tank contour 120 in FIG. 1. These characteristics can be pre-computed and stored rather than being re-computed each time power is restored. The controller then determines optimal intercepting contour 130 by finding frequency and power values that have the voltage gain of efficiency tank 150 equal to the voltage gain of auxiliary tank 160, step 704. Again, optimal intercepting contour 130 could be pre-computed and stored.

The resonant power converter is then started, step 706, by applying the switching frequency to the transistors in auxiliary tank 160, and not pulsing the transistors in efficiency tank 150. The initial switching frequency can be the maximum switching frequency.

In FIG. 10B, the present state of the power converter is determined, step 708, by sensing the primary and secondary currents and the output voltage (PCS, SCS, VOS). From the sensed data the controller calculates the voltage gain and power. The switching frequency currently being used by the controller is the third state variable needed to define the present state.

The controller compares the previous state to the current state along auxiliary-tank contour 120 and determines a slope of the delta gain curve. The slope of the delta gain curve is equal to zero when the gain of the auxiliary tank is equal to the gain of the efficiency tank. The current output voltage is also compared to a desired output voltage setting VSET, such as VDD/2. When the slope is negative, indicating that the current state is moving downward toward optimal intercepting contour 130, and when the output voltage is less than the voltage setting VSET, step 710, then the controller increases the voltage gain of auxiliary tank 160, step 712. The gain is primarily increased by decreasing the switching frequency, but also may be adjusted by changing the duty cycle, relative on time, or relative phase. The switching frequency could be used as a coarse adjustment, and the duty cycle as a fine adjustment. The controller waits a period of time and then re-senses the present state, step 708, for a series of state adjustments.

When the slope is not negative, indicating that the current state is not moving downward toward optimal intercepting contour 130, or and when the output voltage is greater that the voltage setting VSET, step 710, then the power converter may be nearing the optimal intercepting contour. The voltage gain measured for auxiliary tank 160 is compared to the voltage gain calculated for efficiency tank 150, and the difference in voltage gains is compared to a threshold, step 714. When the gain difference is less than this threshold, the optimal intercepting contour has been reached, step 718, and the controller can drive tank select SEL from low to high to stop pulsing the transistors to auxiliary tank 160 and begin pulsing the transistors to efficiency tank 150, thus switching to the efficiency tank, step 720.

When the gain difference is more than the threshold, step 718, the optimal intercepting contour has not yet been reached. The system may have overshot the optimal intercepting contour, or the states may have progressed in a retrograde fashion, or some other problem has occurred. To correct this situation, the controller decreases the voltage gain of auxiliary tank 160, step 716, such as by increasing the switching frequency. The controller then re-senses the present state, step 708, to continue the state adjustments.

Figure 11:
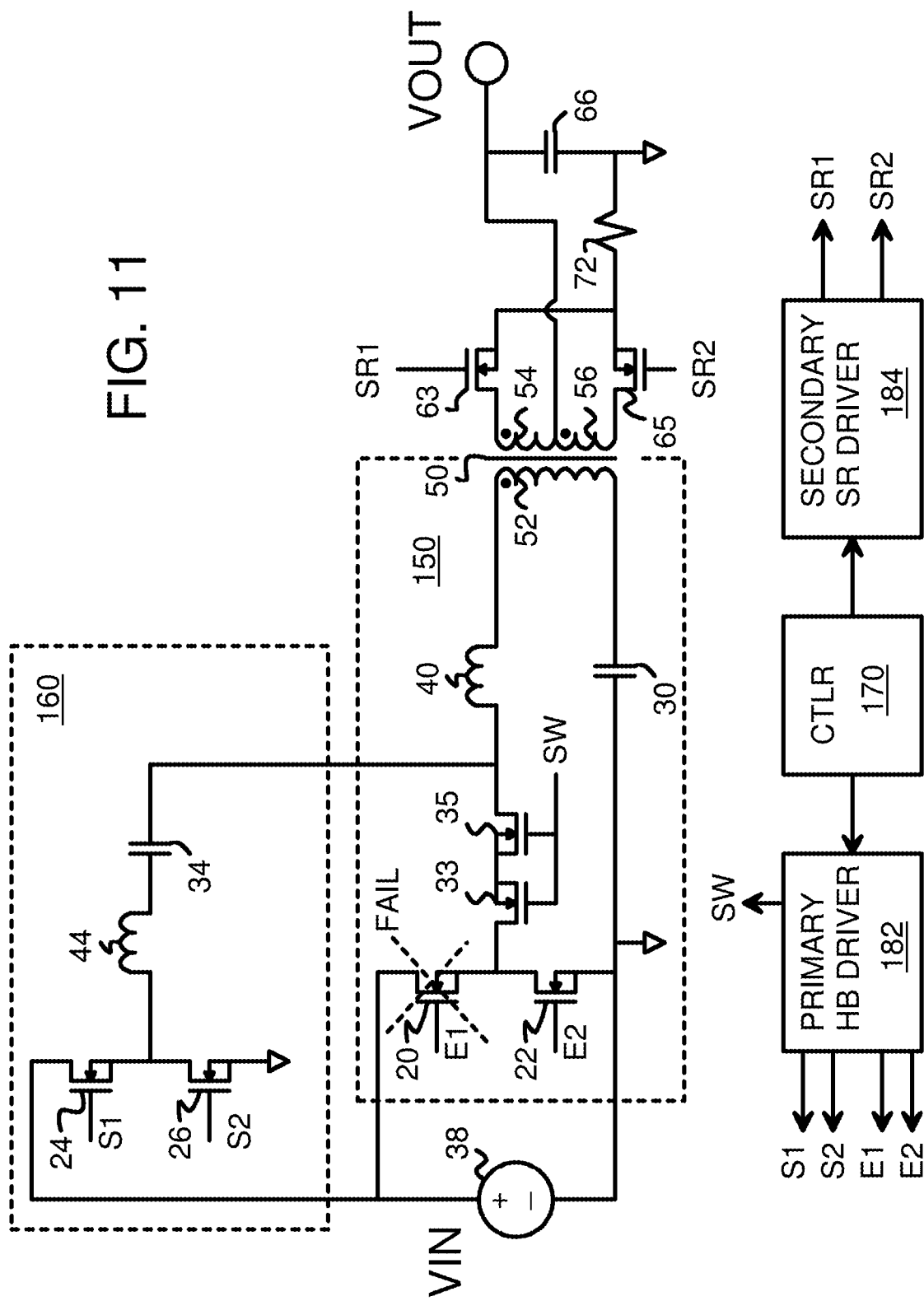
FIG. 11 highlights a fault in the efficiency tank.

FIG. 11 highlights a fault in the efficiency tank. After steady state 5 is reached (FIG. 3), auxiliary tank 160 is disabled by driving signals S1, S2 both low to the gates of transistors 24, 26. Only efficiency tank 150 is enabled by driving pulses at the switching frequency onto the gates of switching transistors 20, 22.

After some time at normal operation a fault occurs in switching transistor 20 that causes transistor 20 to fail. The failure may be partial where the current through transistor 20 is significantly reduced, or a complete failure where modulation transistor 20 stops conducting current or has a short. Damage may have occurred to modulation transistor 20 to cause this failure.

Dynamic frequency displacement controller 230 can detect this failure and switch from efficiency tank 150 to auxiliary tank 160. Signal SW can be driven low to turn off isolation transistors 33, 35 and disconnect the failing transistor 20 from the rest of the circuit. Isolation is especially useful if a short has occurred in either of transistors 20, 22.

However, a voltage deviation and current spike can occur when switching tanks. This current spike is undesirable. The current spike is caused by the output voltage deviation that can occur when the current power and switching frequency produces a different voltage gain in efficiency tank 150 than in auxiliary tank 160. At steady state 5 efficiency tank 150 is not operating at optimal intercepting contour 130.

The inventors have developed a computation-free and non-memory-intensive method of switching tanks that changes the switching frequency by a dynamic amount at tank switchover to a frequency that minimizes any voltage deviation. This method can be activated when a failure is detected or when a large voltage sag occurs on the input. This method can provide a relatively seamless tank switchover when an unexpected event (failure, voltage sag) causes a forced switchover.

Figure 12:
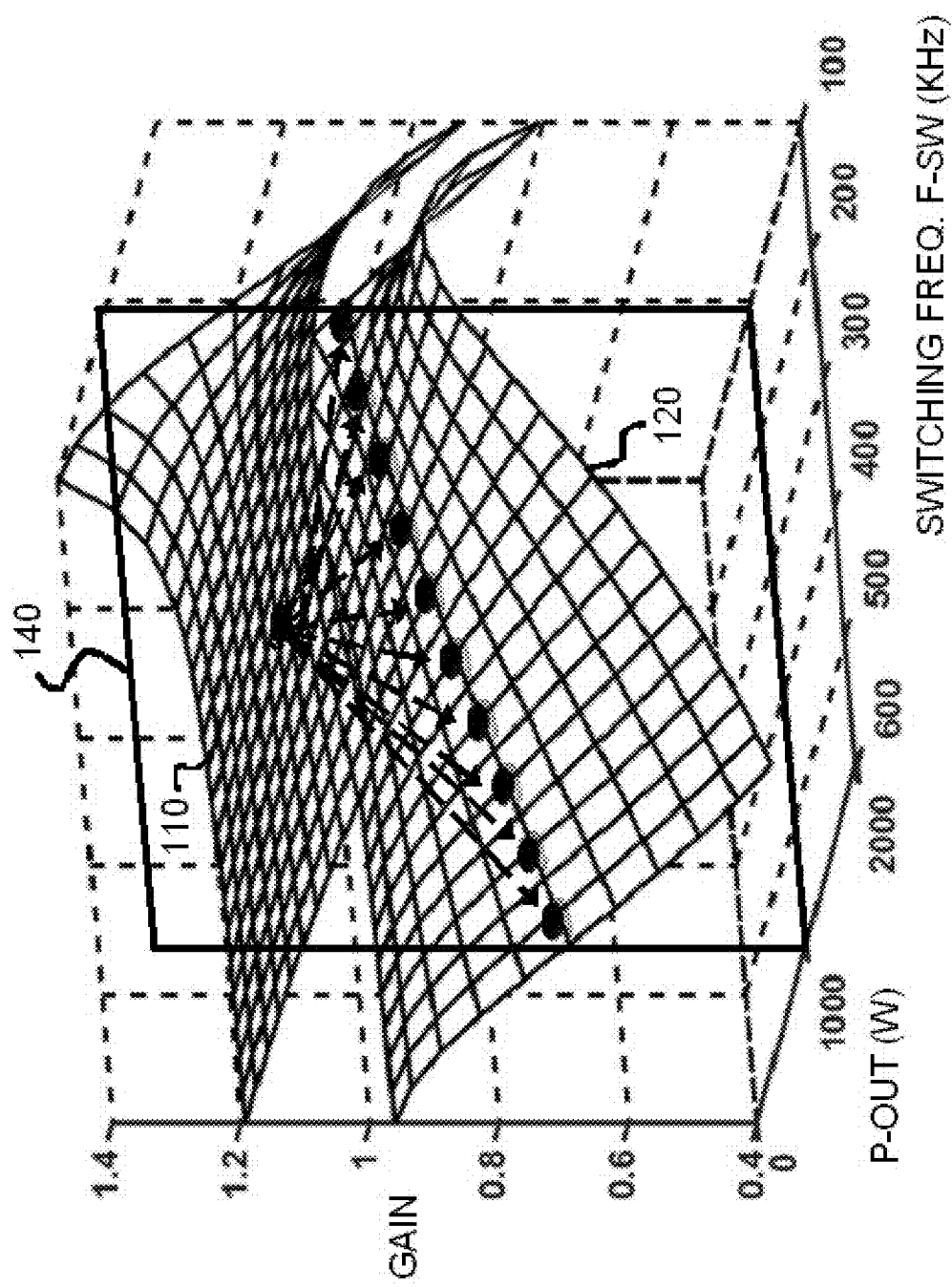
FIG. 12 is a graph showing state projection on a power plane when a forced tank switchover is needed.

FIG. 12 is a graph showing state projection on a power plane when a forced tank switchover is needed. In this graph, efficiency-tank contour 110 is offset upward along the z-axis by +0.2 to separate efficiency-tank contour 110 from auxiliary-tank contour 120 to better visualize state projection.

When a forced switchover is needed, auxiliary tank 160 is disabled and efficiency tank 150 is being pumped by the switching signals applied to its transistors 20, 22. The current state is shown on efficiency-tank contour 110, at a power of 1000 W and a switching frequency of about 470 kHz. The current state intersects power plane 140, which is orthogonal to the y-axis and intersects only states with power equal to 1000 W.

The current state on efficiency-tank contour 110 is projected onto auxiliary-tank contour 120 where auxiliary-tank contour 120 intersects power plane 140. A number of states on auxiliary-tank contour 120 intersect power plane 140 but have different switching frequencies and gains.

Figure 13:
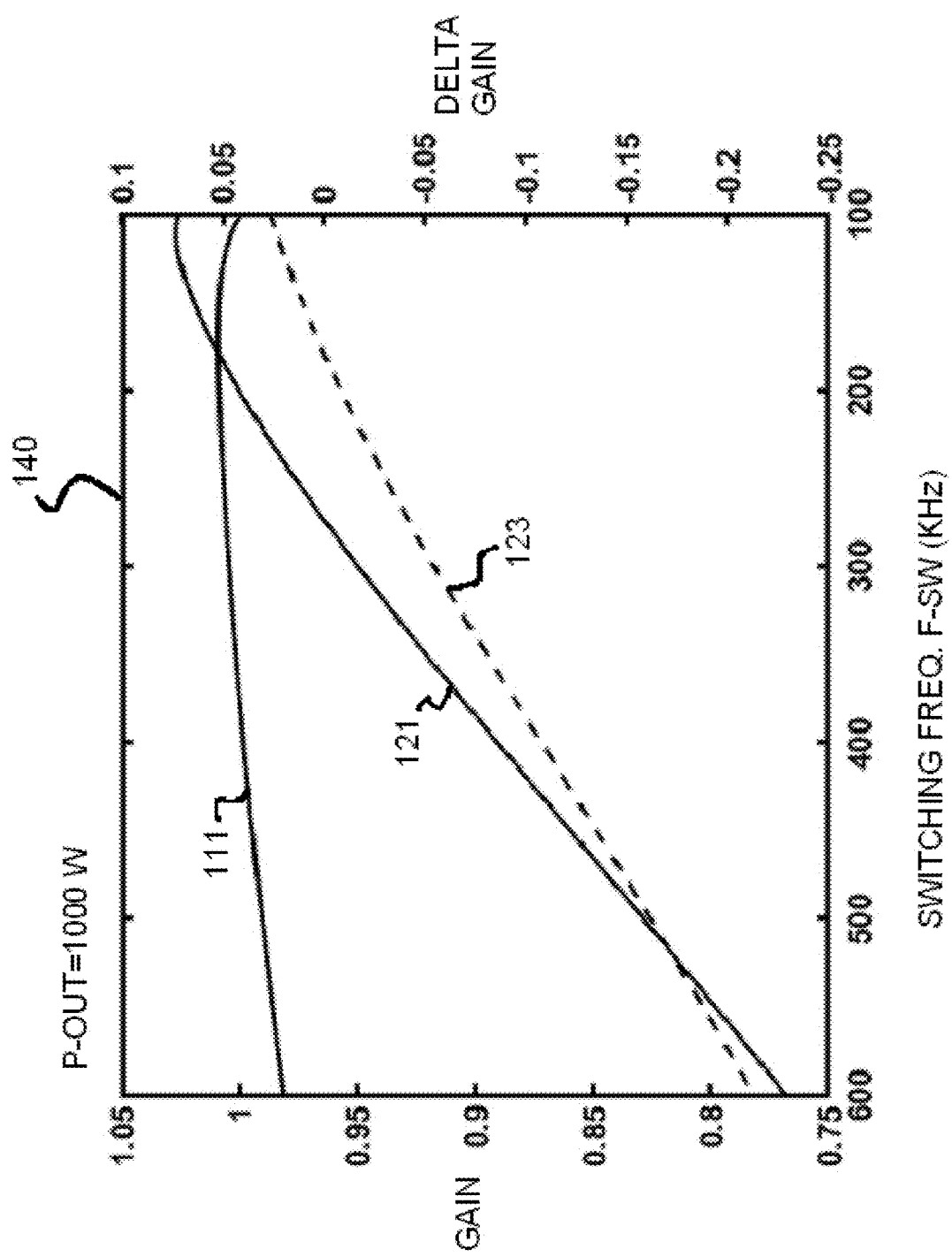
FIG. 13 shows the cross-sectional plane where the power plane intersects the efficiency-tank contour and the auxiliary-tank contour.

FIG. 13 shows the cross-sectional plane where the power plane intersects the efficiency-tank contour and the auxiliary-tank contour. Power plane 140 intersects efficiency-tank contour 110 for all states having an output power of 1000 W, producing efficiency-tank line 111 for the selected power. The gain of these states for efficiency tank 150 is close to 1 for most values of the switching frequency, as shown by efficiency-tank line 111.

Power plane 140 also intersects auxiliary-tank contour 120 for all states having an output power of 1000 W, producing auxiliary-tank line 121 for the selected power. The gain of these states for auxiliary tank 160 drops from about 1 for low switching frequencies around 100 kHz to below 0.8 for high switching frequencies up to 600 kHz, as shown by auxiliary-tank line 121 in the graph. Lines 111, 121 use the left y-axis for gain while line 123 uses the right y-axis for delta gain.

The difference in gain between lines 111, 121 (delta gain) can be calculated by subtracting the gain (y) value for efficiency-tank line 111 from the gain (y) value for auxiliary-tank line 121 for each switching frequency (x) value. This subtraction produces the delta gain for each switching frequency, shown by delta gain line 123. The delta gain is zero where lines 111, 121 cross at 180 kHz, and becomes more negative for higher frequencies.

Figure 14:
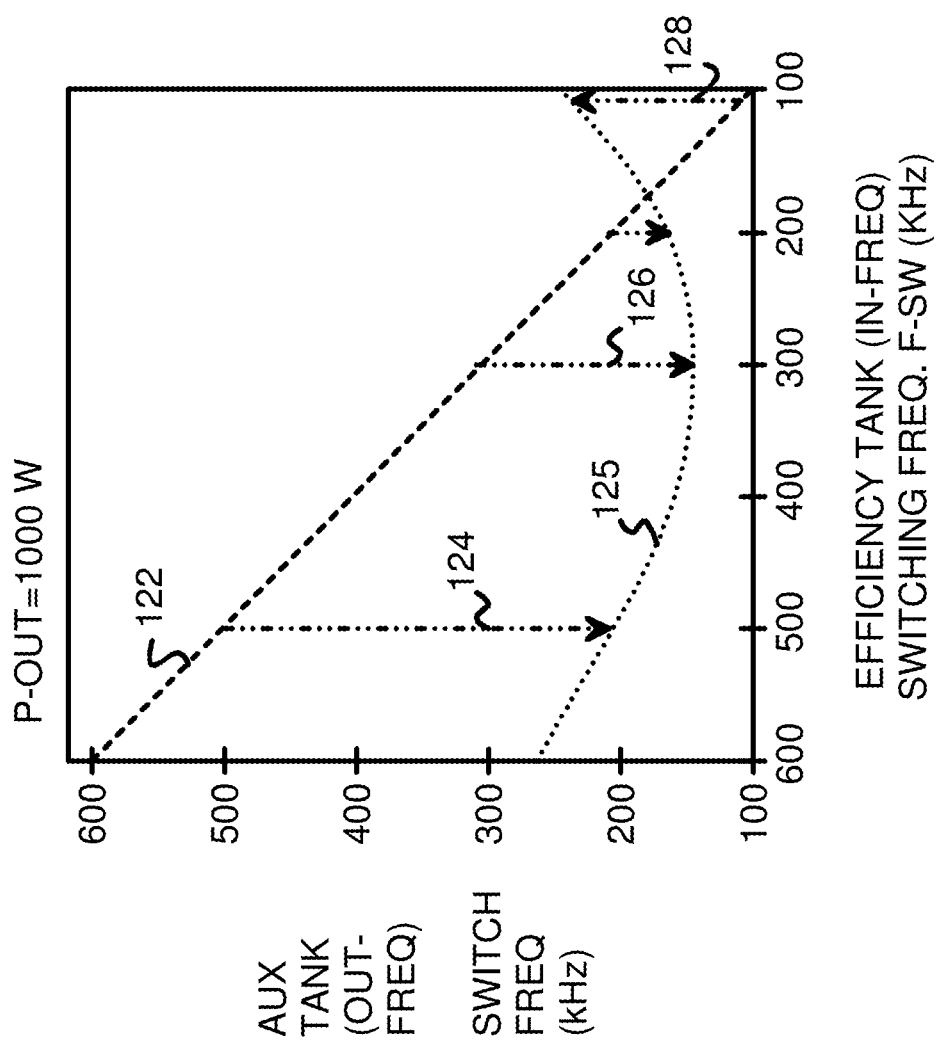
FIG. 14 is a graph showing a dynamic contour line to adjust the switching frequency during a forced tank switchover to minimize output voltage deviation.

FIG. 14 is a graph showing a dynamic contour line to adjust the switching frequency during a forced tank switchover to minimize output voltage deviation.

In FIG. 13, each point along efficiency-tank line 111 can be projected to all points along auxiliary-tank line 121, and the difference in gains (y value difference) computed. The point along auxiliary-tank line 121 that has the lowest difference in gains is selected, and the switching frequency for this minimum-y-difference point on auxiliary-tank line 121 is associated with the frequency of the point on efficiency-tank line 111. This pair of frequencies is then plotted in FIG. 14 as dynamic contour line 125.

In FIG. 14, the frequency of the efficiency-tank is plotted as the x-axis input frequency, while the frequency of the auxiliary tank is plotted as the y-axis output frequency. The input frequency is the switching frequency of efficiency tank 150 before the forced tank switchover while the output frequency is the switching frequency of auxiliary tank 160 after the forced tank switchover. Controller 170 will change the switching frequency FREQ (FIG. 7) from the input frequency to the output frequency when switching from efficiency tank 150 to auxiliary tank 160.

Diagonal line 122 shows where the input and output frequencies are equal. Dynamic contour line 125 intersects diagonal line 122 at around 180 kHz, and this point is also along optimal intercepting contour 130 (FIG. 2). No frequency change is needed when switching tanks at this optimal intersection.

However, at steady state 5, efficiency tank 150 is likely not operating at optimal intercepting contour 130, so a frequency change is needed to compensate for the difference in voltage gains with auxiliary tank 160. When efficiency tank 150 is operating at 500 kHz, auxiliary tank 160 should begin to operate at 200 kHz, according to dynamic contour line 125. Controller 170 stops pulsing transistors 20, 22 at 500 kHz to disable efficiency tank 150, and starts pulsing transistors 24, 26 at 200 kHz to switchover to auxiliary tank 160. This frequency change is shown by arrow 124, from 500 kHz to 200 kHz.

When efficiency tank 150 is operating at 300 kHz, arrow 126 shows that the switching frequency is changed from 300 kHz to 150 kHz when switching to auxiliary tank 160. When efficiency tank 150 is operating at 100 kHz, arrow 128 shows that the switching frequency is changed from 100 kHz to 250 kHz when switching tanks. Dynamic frequency displacement controller 230 (FIG. 7) changes or displaces the input switching frequency to the output switching frequency, as shown by arrows 124, 126, 128.

While dynamic contour line 125 could be re-computed as needed during operation, dynamic contour line 125 can be pre-computed for various values of power plane 140, such as for 900 W, 1000 W, 1100 W, etc. The output frequency values of dynamic contour line 125 could be stored for increments such as for every 10 kHz of the input frequency, thus saving storage space. Interpolation could be performed between the two closest incremental values. The real-time computational work could be significantly reduced using pre-computed data, allowing for controller 170 to rapidly pinpoint the output frequency to switch to at tank switchover.

Figure 15A:
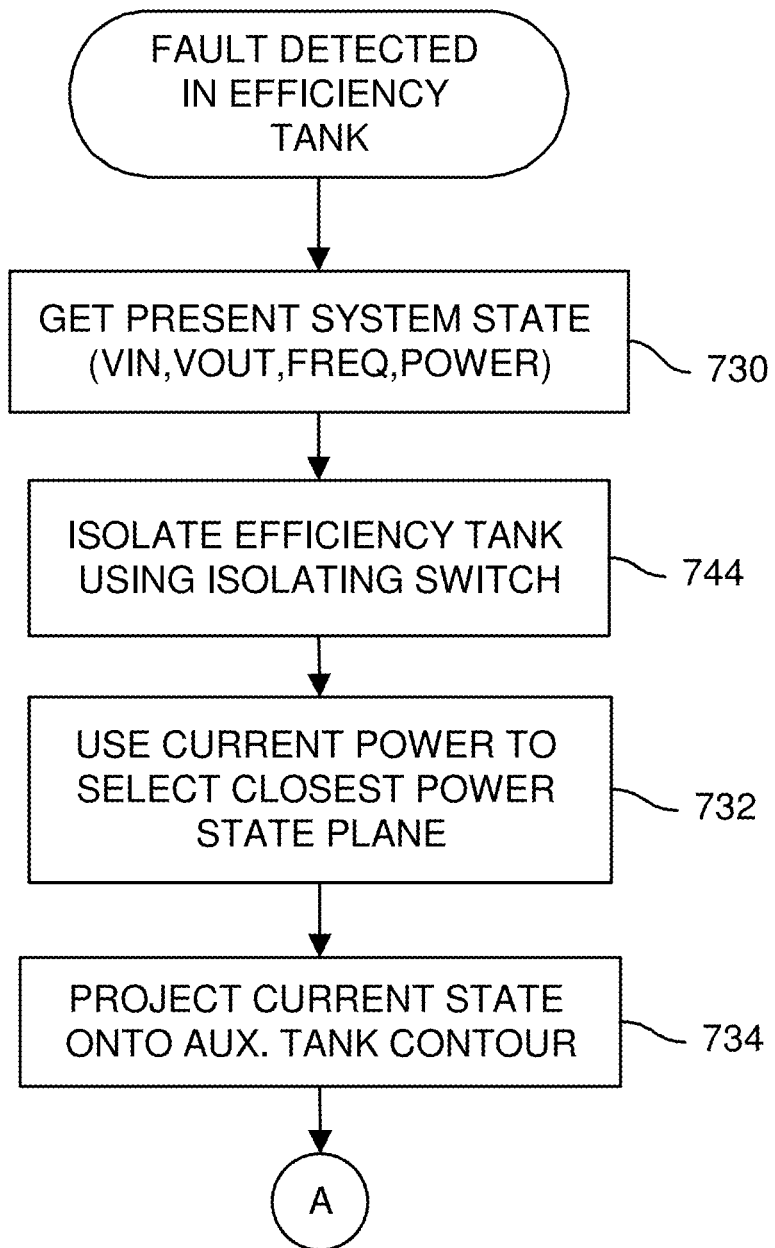
FIGS. 15A-15B show a flowchart of forced tank switchover during fault handling.
Figure 15B:
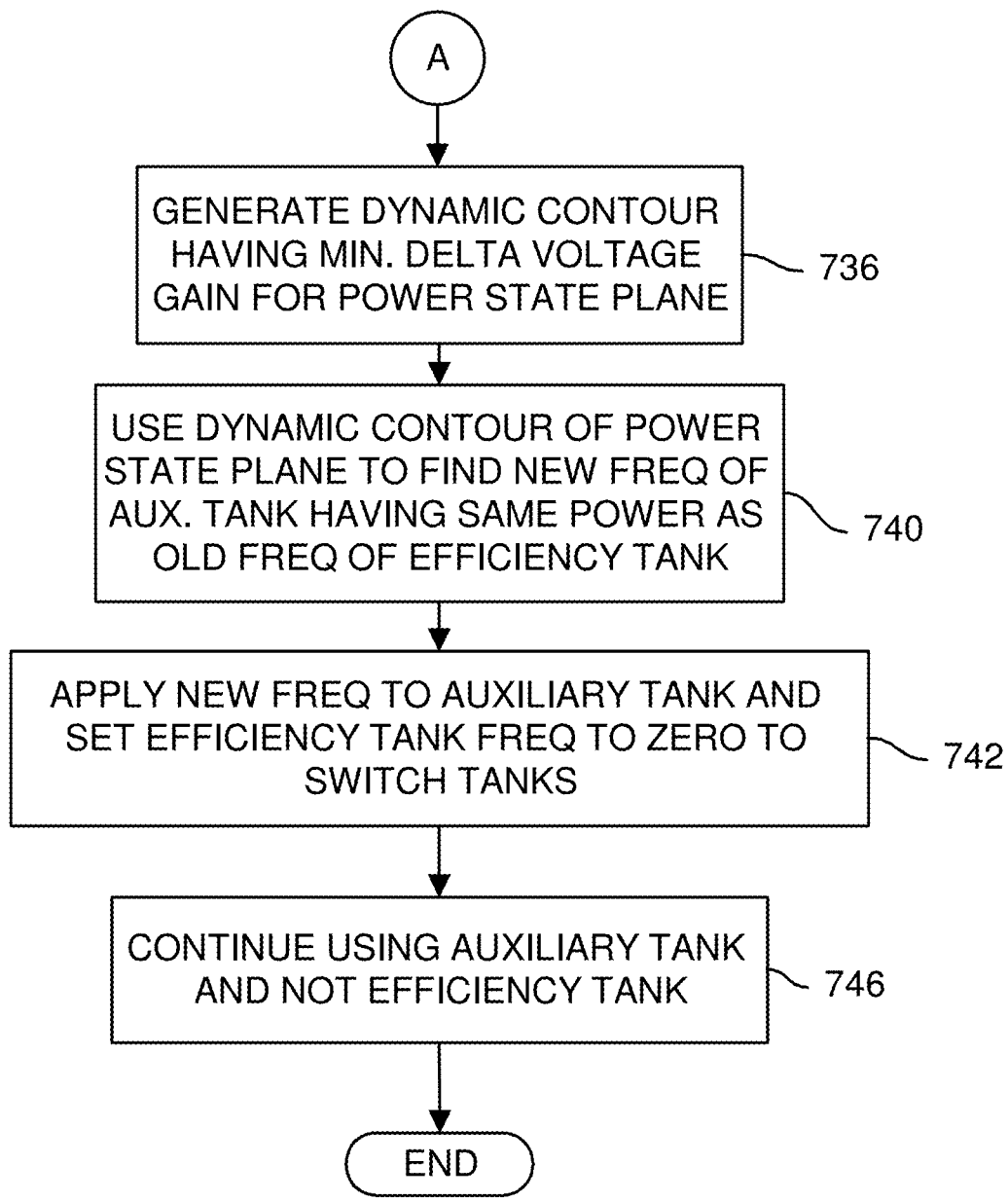

FIGS. 15A-15B show a flowchart of forced tank switchover during fault handling. When a fault is detected in efficiency tank 150, such as transistor 20 being faulty (FIG. 11), or a large input voltage sag, this routine can be activated. The present system state is obtained, step 730, such as by sensing the primary and secondary currents and the output voltage (PCS, SCS, VOS). From the sensed data the controller calculates the voltage gain and power. The switching frequency currently being used by the controller (the input frequency) is the third state variable needed to define the present state.

The controller drives switch signal SW low to turn off isolation transistors 33, 35, (FIG. 11), isolating transistors 20, 22 from the rest of efficiency tank 150 and from transformer 50, step 744. The current power determined in step 730 is used to select the nearest power plane 140, step 732, or nearest two power planes 140 when interpolation is used. The current state on efficiency-tank contour 110 is projected onto auxiliary-tank contour 120, step 734, to generate dynamic contour line 125 having the minimum delta voltage gain, step 736. These steps are shown graphically in FIGS. 12-14 and can be pre-computed, so that steps 732, 734, 736 merely select the dynamic contour line 125 data for the current power from step 730.

The switching frequency of the current state sampled in step 730 is the switching frequency of the efficiency tank, or the input frequency. This input frequency is used to select a data point along dynamic contour line 125 to obtain the output frequency. This output frequency is the switching frequency to apply to auxiliary tank 160, step 740 for the minimal voltage disturbance. Controller 170 applies this output frequency to the gates of transistors 24, 26 to enable auxiliary tank 160 and drives the gates of transistors 20, 22 to ground to switch tanks, step 742. Auxiliary tank 160 continues to be pumped by the switching frequency while efficiency tank 150 is not pulsed, step 746.

Figure 16A:
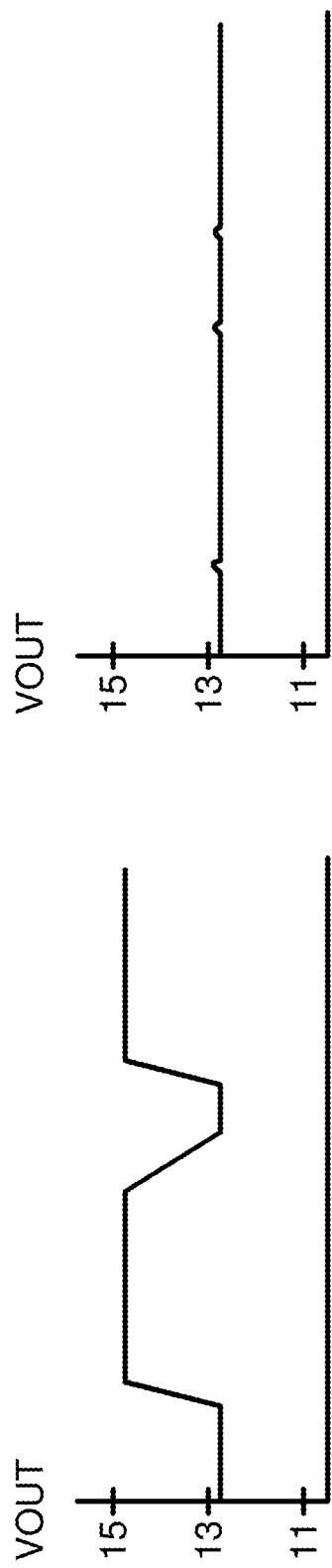
FIGS. 16A-16B show reduced inrush current when a forced switchover to the auxiliary tank occurs.
Figure 16B:
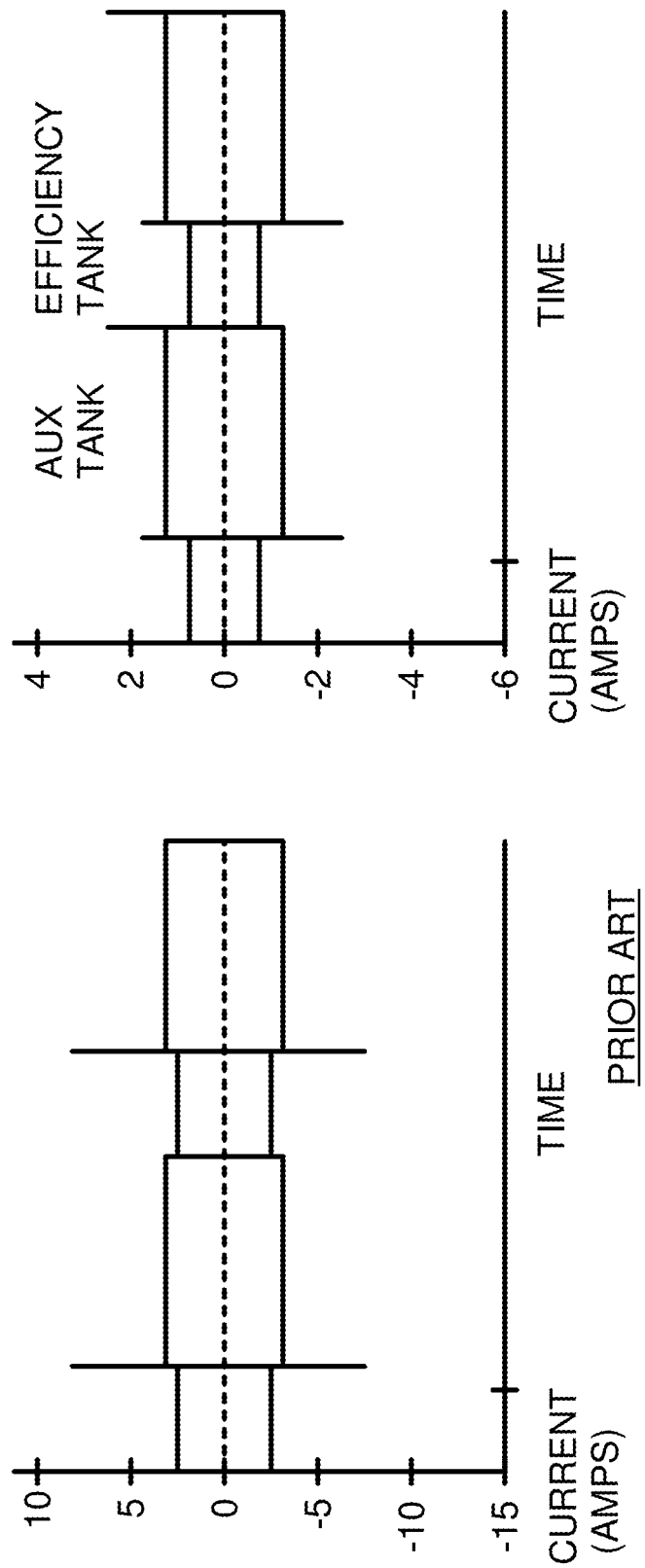

FIGS. 16A-16B show reduced inrush current when a forced switchover to the auxiliary tank occurs. In FIG. 16A, the tanks are switched at a predetermined voltage or current threshold, and the switching frequency remains constant when switching tanks. Since the tanks have different voltage gains at any arbitrary point when forced switching occurs, there is a voltage deviation at tank switchover. This voltage deviation causes a current spike when switching to the auxiliary tank. In the simulation of FIG. 16A, this inrush current spike is about 8 amps.

In FIG. 16B, when a forced tank switchover occurs, the switching frequency is changed from the input frequency to the output frequency as described in FIGS. 12-15. Since the auxiliary tank has the same voltage gain at the output frequency as the efficiency tank at the input frequency, this frequency change at tank switchover results in little or no voltage deviation. The inrush current spike is reduced to about 2 amps. The reduced current spike and the steadier voltage at tank switchover results in a more stable system with steady operation.

FIG. 17 shows recovery from a failure in the efficiency tank. After start-up, the power converter holds the output voltage steady at around 13 volts, with the efficiency tank being pulsed and the auxiliary tank idle. At time Tfault a failure occurs in switching transistor 20 in efficiency tank 150, causing a reduction in current pumped by transistor 20 into the resonant tank. This reduced current causes the output voltage to start to decline gradually over time.

Eventually this fault is detected, such as by controller 170 detecting the drop in output voltage below a threshold, such as 12 volts. Then controller 170 determines the current power, chooses a power plane 140, and uses the current switching frequency as the input frequency to find the output frequency using dynamic contour line 125. Controller 170 then isolates transistors 20, 22 in efficiency tank 150, and begins pulsing transistors 24, 26 in auxiliary tank 160 with the output frequency to switch tanks. This tank switchover occurs at time T2. The output voltage then can remain constant, as shown by line 830, rather than continue to fall, as shown by line 832, if forced tank switchover did not occur.

Dynamic frequency displacement controller 230 in controller 170 provides a fault recovery mechanism that maintains a stable output voltage. This allows the power converter to continue to operate despite a critical failure in efficiency tank 150. Failure recovery is provided for without requiring redundant components, reducing the cost. Such fault tolerance is especially useful for data center applications.

Alternate Embodiments

Several other embodiments are contemplated by the inventors. For example the tank resonator circuits could be changed. Leakage inductor 40 could be part of transformer 50.

The tank switchover can be considered seamless when the output voltage does not change at switchover. A very small change in the output voltage may occur and the switchover still be considered seamless, but larger deviations in the output voltage are not seamless. For example, a voltage change of 1% of the power-supply voltage might be considered seamless while a voltage change of 10% might be considered a voltage deviation. The threshold for determining when a transition is seamless can vary depending on the application.

When the tank switchover occurs at optimal intercepting contour 130, the voltage gains are equal or equal within some threshold, so the transition is considered seamless. When a forced tank switchover is required, the switching frequency is changed from the input frequency to the output frequency to more closely match the voltage gains of the two tanks being switched. This switchover is more likely to generate a larger voltage deviation than when the switchover occurs at optimal intercepting contour 130. However, the degree of voltage deviation is greatly reduced by the frequency change, and the voltage deviation may fall below a desired threshold and thus still be considered to be seamless, but not to the degree that occurs when switchover occurs at optimal intercepting contour 130 with no frequency change. When the voltage gains of the two tanks match, this match may be within some range, such a matching within 10%, or matching within 0.1, etc.

While operation using two tanks has been described in detail, there could be 3 or more tanks, such as shown in FIG. 4. Switchover from one tank to another tank in a system with 3 or more tanks could be implemented for any pair of tanks as described for 2 tanks in FIGS. 5-15B, with the data sets being selected for the pair of tanks from a pool of data sets for all tanks and all possible tank pairs. One or more of the tanks could be used for start-up, and other tanks for boost, and others for efficiency or for other purposes.

The lower inrush current at start up is provided by auxiliary tank 160 can enhance the reliability of the power converter since the inrush current through advanced semiconductor transistors can be reduced, reducing the likelihood of damage. Initial inrush current can be reduced from 24 amps to 8 amps, a ⅔ reduction. Higher reliability is especially useful for power converters in Electric Vehicles (EV's).

Having a second tank allows for the peak efficiency to be maintained, using efficiency tank 150, while also providing an increased voltage boost using auxiliary tank 160. The boost gain margin can be increased by about 300% in simulations. The higher boost gain improves Maximum Power Point Tracking (MPPT). The high efficiency is important for Electric Vehicles (EV's) to extend the driving range, such as km per full charge.

The frequency range can also be reduced by as much as half. A narrower frequency range is useful for medical instruments and other devices to reduce Electro-Magnetic Interference (EMI).

While switch 32 has been described as being open only when a fault is detected, it could also be opened when transistors 20, 22 are not pulsing, such as when auxiliary tanks 160, 162 are being pulsed. Additional switches could be added to other tanks to isolate their transistors if fault detection is added for other tanks as well. Other kinds of isolation switches or devices could be substituted. Voltage sources 38 (FIG. 4) connected to resonant tanks 160, 162, 150 are not necessarily identical, and can originate from a combination of various sources, such as different power grids, photovoltaic, wind turbine, etc.

While three tanks have been shown cascaded together in FIG. 4, additional auxiliary tanks could be inserted between auxiliary tanks 160, 162. The sizes of resonant inductors 44, 46, 40 do not have to be the same but could have different values. For example, resonant inductor 44 could have an inductance value of 10 uH, resonant inductors 46 could have inductance values of 5 uH and 1 uH. Leakage inductor 40 could be a separate inductor or could be parasitic inductances, or various combinations. Inductor values could be ratios of each other, such as resonant inductor 44 being half of the value of leakage inductor 40, etc.

The sizes of transistors 20, 22 could be larger or smaller than the sizes of transistors 24, 26 or of transistors 28, 29.

Transistors 20, 22, 24, 26, 28, 29 could be a mixture of advanced technologies such as Gallium Nitride (GaN) and conventional technologies such as Silicon (Si) and have various geometries and layouts. For example, Gallium-Nitride-based transistors can be used as modulation transistors 20, 22 for efficiency tank 150, while the Silicon-based modulation transistors 24, 26 are used in auxiliary tank 160. The utilization of Gallium-Nitride transistors in efficiency tank 150 has the benefit of extending the maximum operating frequency. This frequency extension in efficiency tank 150 has the benefit of wider dynamic contour coverage.

While cascaded tanks have been shown to share inductors and thus reduce the overall size of inductors needed, more auxiliary tanks 160, 162, . . . could be inserted in between auxiliary tank 160 and efficiency tank 150. This cascaded arrangement of tanks 160, 162, . . . could be useful for fault recovery in one of the auxiliary tanks components, such as resonant inductors 44, 46 and capacitors 34, 36.

Cascading tanks allows for a reduction in component sizes, such as a reduction in the size of the inductors. Also, component stress is distributed over multiple components, such as resonant inductors 44, 46 and capacitors 34, 36, rather than have all stress focused on a single component. Fault tolerance is also improved since the auxiliary tank can take over operation when a failure occurs in the efficiency tank.

Rather than use passive diodes 62, 64, the secondary side could use passive or active transistors. Switching signals could be applied to the gates of these active transistors that have a different frequency that the switching signals to the tank transistors 20-29. Thus an active Synchronous Rectifier (SR) secondary circuit could be substituted. Other variations of the secondary circuit are possible.

The primary ground and the secondary ground could be connected together or could be isolated from each other. The arrangement of the capacitors and inductors in the resonant networks could be re-ordered, reversed, or otherwise changed, and additional devices or branches could be added to the networks.

Various circuits could be substituted or altered. For example, primary current sensor 176 could have other circuit arrangements and type other than that shown in the example circuit of FIG. 8. Various other current or voltage sensor circuits could be substituted, such as for greater sensing accuracy or lower expense or complexity.

While both frequency and duty cycle have been shown as being controlled by Dynamic frequency displacement controller 230 (FIG. 7), a simplified controller might only control the switching frequency FREQ and not control the duty cycle. The duty cycle could remain at a preset value, such as 50%, or might only be altered for fine tuning.

Controller 170 does not directly control the voltage gain, but the voltage gain can be controlled indirectly by adjusting the energy delivered to the resonant tanks by the switching transistors. For example the voltage gain can be decreased by increasing the switching frequency, decreasing duty cycle, or otherwise decreasing the transistor ON time.

A failure may be detected by added failure detection circuitry or sensors, or by the output power suddenly falling. An input voltage sag may be detected by the output voltage VOS sensor, and validated when the voltage sag exceeds a sag threshold. After the forced switchover has occurred, some time could be allowed to elapse before controller 170 again checks the output voltage or failure sensors. Once the voltage sag recovers to an acceptable degree, another forced tank switchover could occur from auxiliary tank 160 back to efficiency tank 150. Dynamic contour line 125 could be used in reverse to determine the frequency change, or a second set of data for dynamic contour line 125 for the reverse direction could be pre-computed and consulted. The Dynamic contour line 125 is typically a curved line rather than a straight line. Lines can be straight or curved as the term is used herein.

Every point along efficiency-tank line 111 (FIG. 13) could be compared to every point along auxiliary-tank line 121 and the gain difference plotted as a heat map as a function of input and output frequencies (FIG. 14), and then dynamic contour line 125 drawn through the coldest areas of the heat map, having the smallest gain difference. Rather than compute the difference for every point along efficiency-tank line 111, computations could be performed for increments, such as every 10 kHz, every 50 kHz, every 1 kHz, etc. Likewise, power plane 140 could be extracted for every 100 W, every 10 W, or some other increment, with larger increments reducing computational load at the expense of accuracy. Interpolation could be performed to determine the output switching frequency, such as by interpolating between the two closest power planes 140, and between the two closest input frequencies along efficiency-tank line 111. These and other computations and the functions performed by dynamic frequency displacement controller 230 and controller 170 could be performed at least in part by a general-purpose computer, processor, Digital-Signal Processor (DSP), Field-Programmable Gate Array (FPGA), Complex Programmable Logic Device (CPLD), Application-Specific Integrated Circuit (ASIC), dedicated logic gates, or various combinations. Instructions or routines may be stored as firmware, hardware, or software. Controller 170 may have dedicated hardware acceleration logic for certain functions that require faster processing, and a programmable engine or processor for other higher-level functions and control routines. One or more state machines or sequencers may be used.

Likewise, efficiency-tank contour 110 and auxiliary-tank contour 120 could be pre-computed and their data stored at various data increments or granularities. Higher granularity could be used near optimal intercepting contour 130 than for other areas of the contours. Smaller state adjustments or frequency adjustments could be made when approaching optimal intercepting contour 130 and larger adjustments when auxiliary state 2 is far from optimal intercepting contour 130.

The transition of states 1, 2, 3, 4, 5 in FIG. 3 does not have to be a smooth line as shown, but could zigzag or regress as the system load or other environmental or circuit factors change. The power converter control is very adaptable and flexible and can adjust for various events or circumstances. The number of intermediate states taken can vary, and optimal intercepting contour 130 can be intercepted during switchover state 3 at different locations along optimal intercepting contour 130. There may be more than one efficiency state 4. Various second-order effects could be modeled when generating efficiency-tank contour 110 and auxiliary-tank contour 120, and these contours may not be as smooth as shown. Some applications may be more sensitive to noise and voltage deviations and thus require more precise modeling and computations of optimal intercepting contour 130, with other applications may permit coarser results or tolerate wider thresholds.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A multi-resonant power converter comprising:
an input for receiving an input voltage;
a transformer;
a rectifier connected to receive an induced secondary current from the transformer, the rectifier generating an output voltage on an output delivering an output power to an output load;
a first resonant tank for driving a primary current through the transformer;
a first switching transistor for driving the first resonant tank from the input in response to a first switching signal applied to control the first switching transistor;
a second resonant tank for driving the primary current through the transformer;
a second switching transistor for driving the second resonant tank from the input in response to a second switching signal applied to control the second switching transistor;
a controller for generating the first switching signal with a switching frequency and for disabling the second switching signal when operating in a first mode; the controller also for generating the second switching signal with the switching frequency and for disabling the first switching signal when operating in a second mode;
wherein the controller is further for adjusting the switching frequency to adjust a voltage gain of the multi-resonant power converter;

a dynamic frequency displacement controller for changing the switching frequency from an input frequency to an output frequency in response to a forced tank switchover that causes the controller to switch from the first mode to the second mode;
a power plane selector that selects a selected power plane in response to the output power when the forced tank switchover occurs;
wherein the selected power plane contains a dynamic contour;
wherein the dynamic contour specifies a plurality of frequency pairs, each frequency pair having:
(1) an input frequency that is a switching frequency of the first resonant tank having a first gain for the output power of the selected power plane; and
(2) an output frequency that is a switching frequency of the second resonant tank having a second gain for the output power of the selected power plane;
wherein the first gain matches the second gain for all frequency pairs in the dynamic contour;
wherein the dynamic frequency displacement controller uses as the input frequency the switching frequency being applied to the first switching transistor for driving the first resonant tank before the forced tank switchover, the dynamic frequency displacement controller using the input frequency to rind the output frequency along the dynamic contour for the selected power plane;
wherein the dynamic frequency displacement controller changes the switching frequency from the input frequency to the output frequency to generate the switching frequency to apply to the second switching transistor for driving the second resonant tank after the forced tank switchover,
wherein the output voltage does not change when the dynamic frequency displacement controller switches from the first mode to the second mode since the voltage gain of the first resonant tank at the input frequency matches the voltage gain of the second resonant tank at the output frequency when forced tank switchover occurs,
whereby the switching frequency is changed at the forced tank switchover without changing the output voltage.

2. A multi-resonant power converter comprising:
an input for receiving an input voltage;
a transformer;
a rectifier connected to receive an induced secondary current from the transformer, the rectifier generating an output voltage on an output delivering an output power to an output load;
a first resonant tank for driving a primary current through the transformer;
a first switching transistor for driving the first resonant tank from the input in response to a first switching signal applied to control the first switching transistor;
a second resonant tank for driving the primary current through the transformer;
a second switching transistor for driving the second resonant tank from the input in response to a second switching signal applied to control the second switching transistor;
a controller for generating the first switching signal with a switching frequency and for disabling the second switching signal when operating in a first mode; the controller also for generating the second switching signal with the switching frequency and for disabling the first switching signal when operating in a second mode;

wherein the controller is further for adjusting the switching frequency to adjust a voltage gain of the multi-resonant power converter;

wherein a first voltage gain of the multi-resonant power converter when operating in the first mode is a first function of the switching frequency and of the output power, the first function being representable by a first contour in a voltage-gain, output-power, switching-frequency space;

wherein a second voltage gain of the multi-resonant power converter when operating in the second mode is a second function of the switching frequency and of the output power, the second function being representable by a second contour in a voltage-gain, output-power, switching-frequency space;

wherein the second function is not identical to the first function, the second contour and the first contour intersecting at an optimal intercepting contour; and a switchover detector that causes the controller to switch from the second mode to the first mode without changing the switching frequency when the switching frequency and the output power match values at the optimal intercepting contour;

wherein the optimal intercepting contour is an intersection of the second contour and the first contour, wherein values of the switching frequency and the output power in the optimal intercepting contour have the second voltage gain match the first voltage gain;

wherein the output voltage does not change when the controller switches from the second mode to the first mode since the voltage gain of the second resonant tank matches the voltage gain of the first resonant tank at the switching frequency and output power when tank switchover occurs.

3. A multi-resonant power converter comprising:

an input for receiving an input voltage;

a transformer;

a rectifier connected to receive an induced secondary current from the transformer, the rectifier generating an output voltage on an output delivering an output power to an output load;

a first resonant tank for driving a primary current through the transformer;

a first switching transistor for driving the first resonant tank from the input in response to a first switching signal applied to control the first switching transistor;

a second resonant tank for driving the primary current through the transformer;

a second switching transistor for driving the second resonant tank from the input in response to a second switching signal applied to control the second switching transistor;

a controller for generating the first switching signal with a switching frequency and for disabling the second switching signal when operating in a first mode; the controller also for generating the second switching signal with the switching frequency and for disabling the first switching signal when operating in a second mode;

wherein the controller is further for adjusting the switching frequency to adjust a voltage gain of the multi-resonant power converter;

wherein the second resonant tank comprises a second inductor in series with a second capacitor;

wherein the first resonant tank comprises a first inductor in series with a first capacitor and in series with the transformer;

wherein during the second mode the second switching transistor is driving the second resonant tank from the input in response to the second switching signal, and the second resonant tank is driving the first resonant tank;

wherein the first resonant tank and the second resonant tank are cascaded together during the second mode.

4. An inrush-current suppressing DC-DC power converter comprising:

a power input having a DC input voltage;

a transformer having primary windings and secondary windings;

a rectifier coupled to the secondary windings to generate an output having a DC output voltage for delivering output power to an output load;

wherein a voltage gain is the DC output voltage divided by the DC input voltage;

an efficiency resonant tank having a rust capacitor and a rust inductor in series with the primary windings in a first loop;

an auxiliary resonant tank having a second inductor and a second capacitor in series with the primary windings in a second loop;

a first pull-up transistor for connecting the power input to the rust loop in response to a rust switching signal;

a first pull-down transistor for connecting a ground to the rust loop in response to a complement first switching signal;

a second pull-up transistor for connecting the power input to the second loop in response to a second switching signal;

a second pull-down transistor for connecting the ground to the second loop in response to a complement second switching signal;

a controller for alternately pulsing the second switching signal and the complement second switching signal with a switching frequency to energize the second loop and not pulsing the rust switching signal and the complement first switching signal to provide inrush current suppression during a start-up process;

wherein the controller alternately pulses the rust switching signal and the complement first switching signal with a switching frequency to energize the first loop and does not pulse the second switching signal and the complement second switching signal to not energize the second inductor during a steady-state operation when the start-up process is completed;

wherein the efficiency resonant tank has a higher efficiency than does the auxiliary resonant tank at the switching frequency and output power used during the steady-state operation; and a switchover detector that signals a tank switchover when current values of the switching frequency and the output power cause the auxiliary resonant tank to produce a voltage gain that matches a voltage gain that would be produced by the efficiency resonant tank for the same current values of the switching frequency and the output power;

wherein the controller reduces the switching frequency during the start-up process until the tank switchover is signaled;

wherein when the tank switchover is signaled, the controller stops pulsing the second switching signal and the complement second switching signal with a current switching frequency and instead starts pulsing the first switching signal and the complement first switching signal with the current switching frequency;

whereby inrush current suppression is provided at start-up by the auxiliary resonant tank cascaded with the efficiency resonant tank, and the auxiliary resonant tank is disabled when tank switchover is signaled when the voltage gain of the auxiliary resonant tank matches the voltage gain of the efficiency resonant tank.

5. The inrush-current suppressing DC-DC power converter of claim 4 wherein the current switching frequency enabling the auxiliary resonant tank before tank switchover occurs is identical to the current switching frequency enabling the efficiency resonant tank after tank switchover, whereby seamless tank switchover occurs with no change in switching frequency, output power, or voltage gain.

6. The inrush-current suppressing DC-DC power converter of claim 5 wherein the first loop comprises:

the first inductor connected to outputs of the first pull-up transistor and the first pull-down transistor;

the primary windings connected between the first inductor and the first capacitor; and the first capacitor connected to the ground.

7. The inrush-current suppressing DC-DC power converter of claim 6 wherein the auxiliary resonant tank has the second inductor and the second capacitor in series with the rust capacitor, the rust inductor, and the primary windings in the second loop, wherein the auxiliary resonant tank is cascaded with the efficiency resonant tank.

8. The inrush-current suppressing DC-DC power converter of claim 7 wherein the second loop comprises:

the second inductor connected to outputs of the second pull-up transistor and the second pull-down transistor, the second capacitor connected between the second inductor and the first inductor, the first capacitor of the first loop; and the first inductor of the first loop wherein the first capacitor and the first inductor are shared by both the first loop and by the second loop.

9. The inrush-current suppressing DC-DC power converter of claim 4 further comprising:

an isolation switch, connected between first inductor and outputs of the first pull-up transistor and the first pull-down transistor, wherein the controller activates the isolation switch to isolate the first pull-up transistor and the first pull-down transistor from the first loop and from the second loop when a fault is detected.

10. The inrush-current suppressing DC-DC power converter of claim 4 further comprising:

a primary current sensor for sensing a primary current through the primary windings of the transformer;

a secondary current sensor for sensing a secondary current through the secondary windings of the transformer;

an output voltage detector for sensing the DC output voltage on the output;

wherein the controller receives sense signals from the primary current sensor, the secondary current sensor, and the output voltage sensor, the controller using the sense signals to calculate the voltage gain and the output power for use by the switchover detector for determining a current state.

11. The inrush-current suppressing DC-DC power converter of claim 10 wherein the switchover detector comprises:

an optimal intercepting contour that is pre-computed as combinations of switching frequencies and output power that the efficiency resonant tank and the auxiliary resonant tank produce a same value of the voltage gain;

wherein the switchover detector signals the tank switchover when the current switching frequency and the output power calculated by the controller match one of the combinations in the optimal intercepting contour, whereby a current state crossing the optimal intercepting contour is detected to signal tank switchover.

12. The inrush-current suppressing DC-DC power converter of claim 11 wherein the controller further comprises:

a dynamic frequency displacement controller for reducing the switching frequency in steps during the start-up process; and a Pulse-Width-Modulation (PWM) generator that receives an indicator of the switching frequency from the dynamic frequency displacement controller and generates pulses having the switching frequency to generate the first switching signal and the complement first switching signal, or to generate the second switching signal and the complement second switching signal.

13. The inrush-current suppressing DC-DC power converter of claim 12 wherein the dynamic frequency displacement controller also adjusts a duty cycle when reducing the switching frequency, the dynamic frequency displacement controller adjusting both the duty cycle and the switching frequency to adjust the voltage gain, the dynamic frequency displacement controller outputting an indicator of the duty cycle to the PWM generator, the PWM generator adjusting a pulse width of the pulses in response to the indicator of the duty cycle, whereby duty cycle and switching frequency are adjusted.

14. The inrush-current suppressing DC-DC power converter of claim 13 wherein during the start-up process, the controller reduces the switching frequency or adjusts the duty cycle to increase voltage gain of the auxiliary resonant tank when the output voltage is less than a set voltage and a slope for prior states is in a direction toward the optimal intercepting contour;

wherein the controller increases the switching frequency or adjusts the duty cycle to decrease voltage gain of the auxiliary resonant tank when the output voltage is greater than the set voltage or the slope for prior states is not in a direction toward the optimal intercepting contour, whereby the controller adjusts the pulses to converge toward the optimal intercepting contour.

15. The inrush-current suppressing DC-DC power converter of claim 13 wherein when a fault is detected when operating the efficiency resonant tank during the steady-state operation, using the current output power to select a power plane having a dynamic contour line, the dynamic contour line indicating an output frequency to apply to the auxiliary resonant tank as the switching frequency after tank switchback, the output frequency causing the auxiliary resonant tank to generate a same value of the voltage gain as the efficiency resonant tank for the output power of the power plane;

wherein the controller stops pulsing the first switching signal and the complement first switching signal and starts pulsing the second switching signal and the complement second switching signal with the output frequency to perform tank switchback after the fault is detected, whereby the switching frequency is changed at tank switchback to generate the same value of the voltage gain as before tank switchback.

16. The inrush-current suppressing DC-DC power converter of claim 15 wherein the dynamic contour line is pre-computed for a plurality of power planes, each dynamic contour line being stored as a plurality of frequency displacements that indicate a change in the switching frequency at tank switchback, or stored as a plurality of frequency pairs, each frequency pair having an input frequency that is the switching frequency of the efficiency resonant tank before tank switchback, and an output frequency of the auxiliary resonant tank after tank switchback, each frequency pair being a tank operating point that generates a same value of the voltage gain for both tanks.

17. The inrush-current suppressing DC-DC power converter of claim 15 wherein the fault is detected when the input voltage falls below an error threshold during the steady-state operation.

18. A current-boost DC-DC power converter comprising:
- a Direct Current (DC) input for receiving a DC input voltage;
- a DC output having a DC output voltage and an output current having an output power,
- a transformer for inducing a secondary current in response to a primary current;
- a rectifier receiving the secondary current from the transformer, the rectifier generating the DC output voltage on an DC output;
- a first resonant tank having a first capacitor and a first inductor in series with the transformer for driving the primary current through the transformer;
- a first converter that converts the DC input voltage to a first AC voltage that drives the primary current through the first resonant tank when a switching frequency is applied to control the first converter;
- a second resonant tank having a second capacitor and a second inductor in series with the first resonant tank for driving a boost current through the first resonant tank to the transformer;
- a second converter that converts the DC input voltage to a second AC voltage that drives the boost current through the second resonant tank when the switching frequency is applied to control the second converter;
- a controller for applying the switching frequency to the first converter and for disabling the second converter when operating in a first mode; the controller also for applying the switching frequency to the second converter and for disabling the first convert when operating in a second mode;
- wherein the controller is further for adjusting the switching frequency to adjust a voltage gain of the current-boost DC-DC power converter; and
- a switchover detector that detects a switchover state when the switching frequency and the output power of the current-boost DC-DC power converter would generate equal values of voltage gain for the first mode and for the second mode;
- wherein when the switchover detector detects the switchover state, the controller switches from the second mode to the first mode without changing the switching frequency.

19. The current-boost DC-DC power converter of claim 18 further comprising:
- a dynamic frequency displacement controller for changing the switching frequency from an input frequency to an output frequency in response to a forced tank switchover that causes the controller to switch from the first mode to the second mode;
- wherein the dynamic frequency displacement controller selects a subset of a plurality of frequency pairs, the subset being selected by the output power;
- wherein each frequency pair in the plurality of frequency pairs comprises:
  (1) an input frequency that is a switching frequency of the first resonant tank having a second gain for the output power of the selected subset; and
  (2) an output frequency that is a switching frequency of the second resonant tank having a first gain for the output power of the selected subset;
- wherein the first gain matches the second gain for all frequency pain;
- wherein the dynamic frequency displacement controller selects a frequency pair in the selected subset having the input frequency matching the switching frequency being applied to the first converter, the dynamic frequency displacement controller reading the output frequency from the frequency pair selected, the dynamic frequency displacement controller applying the output frequency as the switching frequency to the second converter and disabling the rust converter to switch to the second mode during the forced tank switchover.

* * * * *